US012537914B2

(12) United States Patent
Kaku et al.

(10) Patent No.: US 12,537,914 B2
(45) Date of Patent: Jan. 27, 2026

(54) RECORDING INFORMATION CREATION SYSTEM, METHOD FOR CREATING RECORDING INFORMATION, AND NON-TRANSITORY COMPUTER-EXECUTABLE MEDIUM

(71) Applicants: Yusho Kaku, Kanagawa (JP); Takahiro Kamekura, Tokyo (JP); Shigeyuki Ishii, Ibaraki (JP)

(72) Inventors: Yusho Kaku, Kanagawa (JP); Takahiro Kamekura, Tokyo (JP); Shigeyuki Ishii, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 234 days.

(21) Appl. No.: 18/155,273

(22) Filed: Jan. 17, 2023

(65) Prior Publication Data

US 2023/0308607 A1    Sep. 28, 2023

(30) Foreign Application Priority Data

Jan. 31, 2022    (JP) ................... 2022-013452

(51) Int. Cl.
*H04N 7/15*    (2006.01)
*G06T 5/50*    (2006.01)
*H04N 7/14*    (2006.01)
*H04N 23/698*    (2023.01)

(52) U.S. Cl.
CPC ............... *H04N 7/155* (2013.01); *G06T 5/50* (2013.01); *H04N 7/147* (2013.01); *H04N 7/152* (2013.01); *H04N 23/698* (2023.01); *G06T 2207/20221* (2013.01)

(58) Field of Classification Search
CPC ........ H04N 7/155; H04N 7/147; H04N 7/152; H04N 23/698; H04N 7/14; H04N 7/15; G06T 5/50; G06T 2207/20221
See application file for complete search history.

(56) References Cited

U.S. PATENT DOCUMENTS

| 2004/0263636 | A1* | 12/2004 | Cutler ............... H04N 7/15 348/211.3 |
| 2017/0013225 | A1 | 1/2017 | Takahashi et al. |
| 2017/0127020 | A1 | 5/2017 | Takahashi et al. |

(Continued)

FOREIGN PATENT DOCUMENTS

| JP | 2017-022689 | 1/2017 |
| JP | 2017-083661 | 5/2017 |

(Continued)

OTHER PUBLICATIONS

Extended European Search Report for EP23153433.0 mailed on Jun. 27, 2023.

(Continued)

*Primary Examiner* — Yosef K Laekemariam
(74) *Attorney, Agent, or Firm* — IPUSA, PLLC

(57) ABSTRACT

A system includes circuitry and a memory that stores an information recording application. When executed at a terminal apparatus, the information recording application creates recording information according to screen information displayed by a teleconference application selected by the information recording application and image information representing a surrounding space around a device acquired by the device.

21 Claims, 24 Drawing Sheets

(56) References Cited

U.S. PATENT DOCUMENTS

| | | |
|---|---|---|
| 2017/0131788 A1 | 5/2017 | Kaku |
| 2019/0028667 A1 | 1/2019 | Faulkner |
| 2019/0166330 A1 | 5/2019 | Ma et al. |
| 2019/0289153 A1 | 9/2019 | Kaku |
| 2019/0341050 A1 | 11/2019 | Diamant et al. |
| 2020/0186407 A1* | 6/2020 | Morita ............... H04L 65/4053 |
| 2021/0320953 A1 | 10/2021 | Sexauer |

FOREIGN PATENT DOCUMENTS

| | | |
|---|---|---|
| JP | 2018-055022 | 4/2018 |
| JP | 2020-115609 | 7/2020 |
| WO | 2022/046810 | 3/2022 |

OTHER PUBLICATIONS

Office Action dated Nov. 12, 2024 issued with respect to the corresponding Japanese Patent Application No. 2023-017430.
Japanese Office Action for 2025-079431 mailed on Oct. 7, 2025.

\* cited by examiner

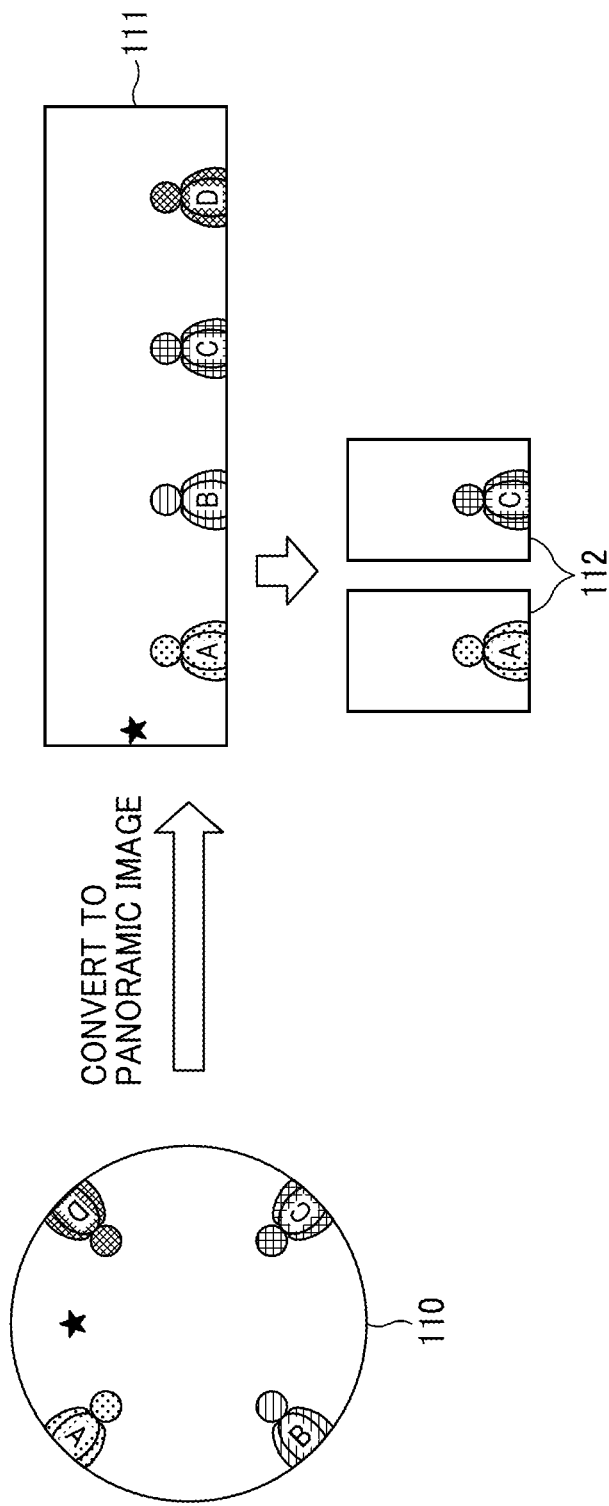

FIG. 8

| CON-FER-ENCE ID | RE-CORD-ING ID | UPDATE DATE/TIME | TITLE | UPLOAD | STORAGE LOCATION |
|---|---|---|---|---|---|
| 091 | 151 | 20XX/1/25 10:30 | DESIGN MEETING | - | |
| 091 | 152 | 20XX/1/25 10:50 | DESIGN MEETING | - | |
| 109 | 198 | 20XX/1/27 14:30 | DEVELOPMENT MEETING | DONE | http://sample.com/file/... |
| 123 | 250 | 20XX/1/28 15:00 | PATENT MEETING | DONE | http://sample.com/file/... |
| ... | ... | ... | ... | ... | ... |

FIG. 9

| CONFER-ENCE ID | PARTICI-PANT | TITLE | START DATE/TIME | END DATE/TIME | LOCATION |
|---|---|---|---|---|---|
| 001 | U001 U002 | ABC MEETING | 20XX/1/5 10:00 | 20XX/1/5 11:00 | CONFERENCE ROOM A |
| 002 | U001 U003 | DEF MEETING | 20XX/1/5 9:00 | 20XX/1/5 10:00 | CONFERENCE ROOM B |
| 003 | U001 U008 U009 | GHI MEETING | 20XX/1/6 14:00 | 20XX/1/6 15:00 | CONFERENCE ROOM A |
| ... | ... | ... | ... | ... | ... |

FIG. 10

| CON-FER-ENCE ID | RE-CORD-ING ID | UPDATE DATE/TIME | TITLE | UPLOAD | STORAGE LOCATION |
|---|---|---|---|---|---|
| 001 | 001 | 20XX/1/5 11:00 | ABC MEETING | DONE | http://sample.com/file/... |
| 002 | 002 | 20XX/1/5 10:00 | DEF MEETING | DONE | http://sample.com/file/... |
| 003 | 003 | 20XX/1/6 15:00 | GHI MEETING | DONE | http://sample.com/file/... |
| ... | ... | ... | ... | ... | ... |

# RECORDING INFORMATION CREATION SYSTEM, METHOD FOR CREATING RECORDING INFORMATION, AND NON-TRANSITORY COMPUTER-EXECUTABLE MEDIUM

CROSS-REFERENCE TO RELATED APPLICATIONS

This patent application is based on and claims priority pursuant to 35 U.S.C. § 119(a) to Japanese Patent Application No. 2022-013452, filed on Jan. 31, 2022, in the Japan Patent Office, the entire disclosure of which is hereby incorporated by reference herein.

BACKGROUND

Technical Field

Embodiments of this disclosure relate to a recording information creation system, a method for creating recording information, and a non-transitory computer-executable medium.

Related Art

Known teleconferencing systems transmit images and audio from one site to one or more other sites in real time to allow users at remote sites to conduct a meeting using the images and audio.

SUMMARY

An embodiment of the present disclosure includes a system including circuitry and a memory that stores an information recording application. When executed at a terminal apparatus, the information recording application creates recording information according to screen information displayed by a teleconference application selected by the information recording application and image information representing a surrounding space around a device acquired by the device.

An embodiment of the present disclosure includes a method for creating recording information performed by a terminal apparatus. The method includes with an information recording application, creating recording information according to screen information displayed by a teleconference application selected by the information recording application and image information representing a surrounding space around a device acquired by the device.

An embodiment of the present disclosure includes a non-transitory computer-executable medium storing a program storing instructions which, when executed by one or more processors of a terminal apparatus, causes the terminal apparatus to create recording information according to screen information displayed by a teleconference application selected by the program and image information representing a surrounding space around a device acquired by the device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an illustration for describing a panoramic image and clipping of talker images, according to an embodiment of the present disclosure;

FIG. 8 is a table of an example of data structure of image recording information stored in an information storage unit, according to an embodiment of the present disclosure;

FIG. 9 is a table of an example of data structure of conference information managed by a conference management unit, according to an embodiment of the present disclosure;

FIG. 10 is a table of an example of data structure of recording information stored in a recording information storage unit, according to an embodiment of the present disclosure;

Figure 1:
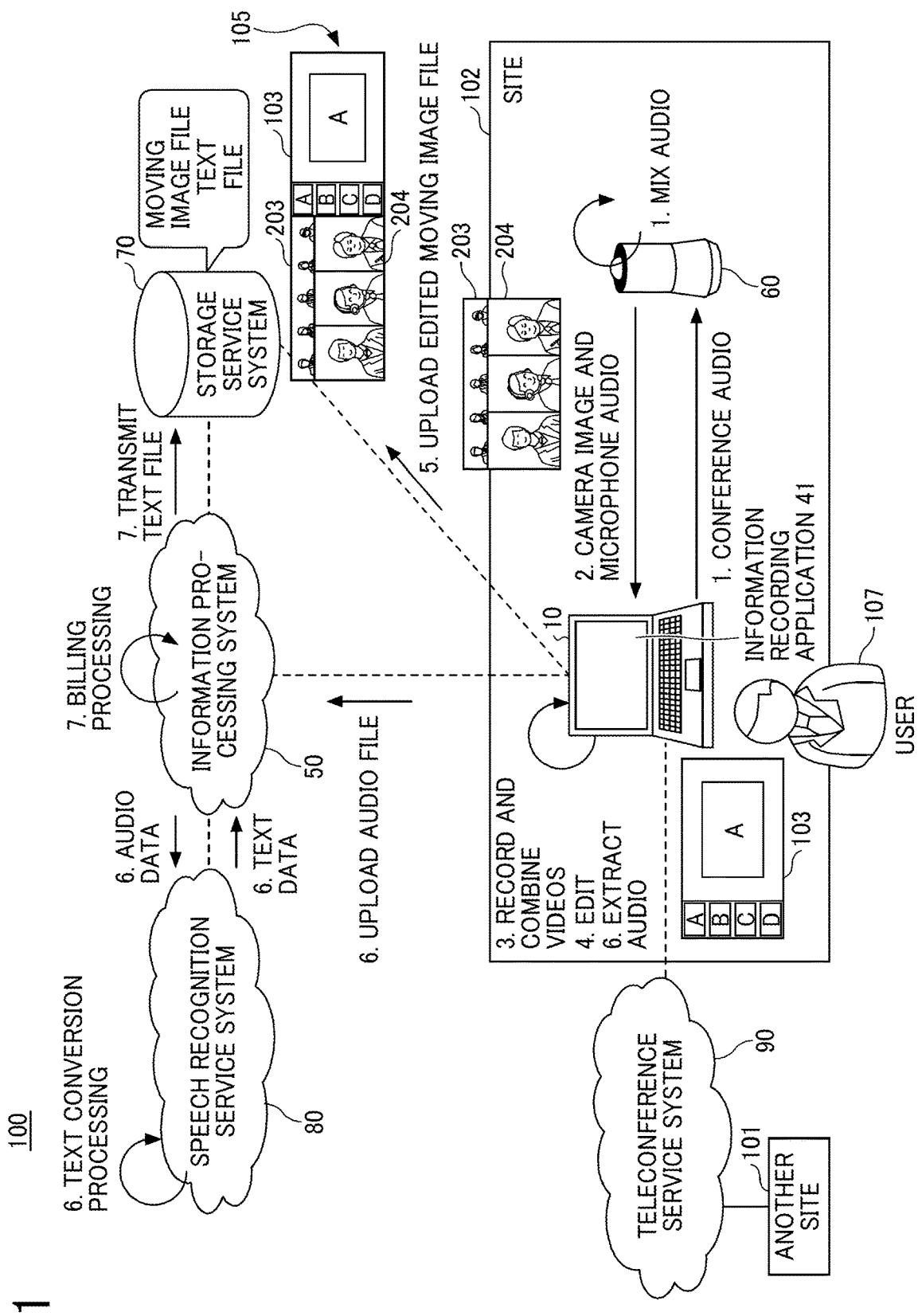
FIG. 1 is a schematic diagram illustrating an overview of creating recording information that stores a screen of an application executed during a teleconference together with a panoramic image of surroundings, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A recording information creation system 100 and a recording information creation method performed by the recording information creation system 100 according to example embodiments of the present disclosure are described.

Example of Method for Creating Minutes of Teleconference

Referring to FIG. 1, a description is given of an overview of a method for creating minutes using a panoramic image and an application screen. FIG. 1 is a schematic diagram illustrating an overview of creating recording information that stores a screen of an application executed during a teleconference together with a panoramic image of surroundings, according to the present embodiment. As illustrated in FIG. 1, a user at an own site 102 uses a teleconference service system 90 to hold a teleconference with another user at another site 101.

A meeting device 60 includes an imaging device capable of capturing an image of surroundings at 360 degrees, a microphone, and a speaker. The meeting device 60 processes image data obtained by capturing the image of the surroundings at 360 degrees to generate a horizontal panoramic image. In the following description, such a horizontal panoramic image may be referred to as a "panoramic image." The recording information creation system 100 according to the present embodiment generates recording information (e.g., minutes) using the panoramic image and a screen created by an application executed by a terminal apparatus 10. The recording information creation system 100 synthesizes audio received by a teleconference application 42 and audio acquired by the meeting device 60 to generate synthesized audio data and includes the synthesized audio data in the recording information. A description is now given of the overview.

(1) On the terminal apparatus 10, an information recording application 41 described below and the teleconference application 42 are operating. In another example, in addition to those applications, an application for displaying documents is also operating. The information recording application 41 transmits audio to be output from the terminal apparatus 10 to the meeting device 60. The audio to be output from the terminal apparatus 10 includes audio received under control of the teleconference application 42 from another site and is an example of first audio data. The meeting device 60 mixes (synthesizes) audio acquired by the meeting device 60 itself and the audio received using the teleconference application 42.

The audio acquired by the meeting device 60 is an example of second audio data.

(2) The meeting device 60 executes processing of cutting out an image of a talker from a panoramic image on the basis of a direction in which audio is acquired by the microphone included in the meeting device 60 and generates a talker image. The meeting device 60 transmits both the panoramic image and the talker image to the terminal apparatus 10.

(3) The information recording application 41 operating on the terminal apparatus 10 can display a panoramic image 203 and a talker image 204. The information recording application 41 combines a desired application screen selected by the user (e.g., a teleconference application screen 103), the panoramic image 203, and the talker image 204. For example, the information recording application 41 combines the panoramic image 203, the talker image 204, and the teleconference application screen 103 in a manner that the panoramic image 203 and the talker image 204 are arranged on the left side, and the teleconference application screen 103 is arranged on the right side. In the following description, an image thus combined may be referred to as a "combined image 105." The application screen is an example of screen information (described below) displayed by each application such as the teleconference application 42. Since the processing of (3) is repeatedly executed, the combined image 105 is a moving image. In the following description, such a moving image may be referred to as a "composite moving image." Further, the information recording application 41 combines the composite moving image with the synthesized audio to generate a moving image with audio.

In the present embodiment, an example is described in which the panoramic image 203, the talker image 204, and the teleconference application screen 103 are combined. In another example, the information recording application 41 stores these images separately and arranges these images on a screen at the time of reproduction.

(4) The information recording application 41 receives an edit operation such as cutting off of unnecessary parts by a user and completes the composite moving image. The composite moving image forms a part of the recording information.

(5) The information recording application 41 transmits the created composite moving image (with the audio) to a storage service system 70 for storing.

(6) Further, the information recording application 41 extracts only the audio from the composite moving image and transmits the extracted audio to an information processing system 50. In another example, the information recording application 41 uses the audio before being combined. The information processing system 50 transmits the audio to a speech recognition service system 80 that converts the audio into text data. The text data includes data indicating an elapsed time from a start of recording when the audio is generated. In other words, the text data includes data indicating how many minutes have elapsed from a start of recording until utterance.

In a case that text conversion is performed in real time, the meeting device 60 directly transmits audio to the information processing system 50.

(7) The information processing system 50 transmits the text data to the storage service system 70 for storing in addition to the composite moving image. The text data forms a part of the recording information.

The information processing system 50 has a function to execute processing of charging the user for a service used by the user. For example, a charging fee is calculated on the basis of an amount of the text data, a file size of the composite moving image, processing time, or the like.

As described above, in the composite moving image, the panoramic image of a surrounding space including the user and the talker image are displayed. Further, in the composite moving image, a screen of an application displayed during the teleconference, such as the teleconference application 42, is displayed. When a participant or a person who has not participated in the teleconference views the composite moving image as the minutes, scenes during the teleconference are reproduced with a sense of presence.

Terms

The term "application (app)" refers to software developed or used for a specific function or purpose. The application includes a native application and a web application. Alternatively, the web application (a cloud application provided by a cloud service) may operate in cooperation with the native application or a web browser.

The expression "application being executed" refers to an application in a state from the start of application to the end of the application. The application is not necessarily active. In other words, the application does not have to be displayed in the foreground and may operate in the background.

The term "device" refers to an apparatus that can capture an image around the device and collect audio around the device. In one example, the device is used as being connected to the terminal apparatus. In another example, the device is built in the terminal apparatus. In another example, the device is used as being connected to the cloud service, instead of being directly connected to the terminal apparatus. In the present embodiment, the term "meeting device" is used to indicate the device.

Image information of surroundings around the meeting device acquired by the meeting device refers to image information acquired by the meeting device capturing an image of a surrounding space (for example, 180 to 360 degrees in the horizontal direction) around the meeting device. The image information of surroundings around the meeting device refers to an image acquired by performing predetermined processing on image information of a curved-surface image captured by the meeting device. Examples of the predetermined processing include, but are not limited to, processing of creating, from information captured by the meeting device, the image information representing the surroundings, such as flattening processing on the captured image of the curved surface. Examples of the predetermined processing may further include processing of clipping an image of a talker and processing of combining the image of the surroundings and the talker image, in addition to the processing for creating the image information representing the surroundings. In the present embodiment, the term "panoramic image" is used to describe the image of the surroundings. The panoramic image is an image having an angle of view of substantially 180 to 360 degrees in the horizontal direction. The panoramic image is not necessarily captured by a single meeting device. In another example, the panoramic image is by a combination of multiple imaging devices having an ordinary angle of view. In the present embodiment, the meeting device is assumed to be used as being provided at a place such as on a table for use in a conference held at a site or to grasp a situation of surroundings. In another example, the meeting device is a device used for monitoring (security, disaster prevention, etc.), watching (childcare, nursing, etc.), or analyzing a situation of a site (solution, marketing, etc.)

The term "recording information" refers to information recorded by the information recording application 41. The recording information is stored in a viewable manner in association with identification information of a certain conference (meeting). Examples of the recording information are as follows:

moving image data created on the basis of screen information displayed by a selected application (e.g., a teleconference application) and the image information of surroundings around the device acquired by the device;

audio information acquired and synthesized by the teleconference application (the terminal apparatus) and the meeting device provided at a site during a conference (meeting);

text information obtained by converting the acquired audio information; and any data or image, which is related information relating to a conference (meeting). Examples of the any data or image include, but are not limited to, a document file used during the conference, an added memo, translation data obtained by translating the text data, and images and stroke data created by a cloud electronic whiteboard service during the conference.

In a case that the information recording application 41 records the teleconference application screen or the situation of a conference held at the site, the recording information is sometimes used as minutes of the held conference. The minutes are merely examples of the recording information. The name of the recording information may vary depending on contents of the teleconference or contents carried out at the site, and may be referred to as a record of communication or a record of situation at a site, for example. Further, the recording information includes files of multiple formats such as a moving image file (the composite moving image or the like), an audio file, a text data (text data obtained by performing speech recognition on audio) file, a document file, an image file, and a spreadsheet file. Each of the files and identification information of the conference are associated with each other. Thus, when the files are viewed, the files are collectively or selectively viewable in a chronological order.

The term "tenant" refers to a group of users such as a company, a local government, or a part of such organizations that has a contract to receive a service from a service provider. In the present embodiment, creation of the recording information and conversion into text data are performed since the tenant has a contract with the service provider.

The term "remote communication" refers to audio-and-video-based communication using software and the terminal apparatus with a counterpart at a physically remote site.

An example of the remote communication is a teleconference. The conference may be referred to as a meeting, a session, a discussion, a consultation, an application for a contract, a gathering, a get-together, a seminar, a lecture, a study meeting, a study session, or a workshop.

The term "site" refers to a place where an activity is performed. A conference room is an example of the site. The conference room is a room provided to be sued mainly for a conference. Other examples of the site include, but are not limited to, a home, a reception, a store, a warehouse, an outdoor site, and any other suitable place or space, provided that the terminal apparatus, a device, or the like is located in the site.

The term "audio" refers to an utterance made by a person, ambient sound, or the like. The term "audio data" refers to data obtained by converting the audio. In the description of the present embodiment, the audio and the audio data are not strictly distinguished from each other.

Example of System Configuration

Figure 2:
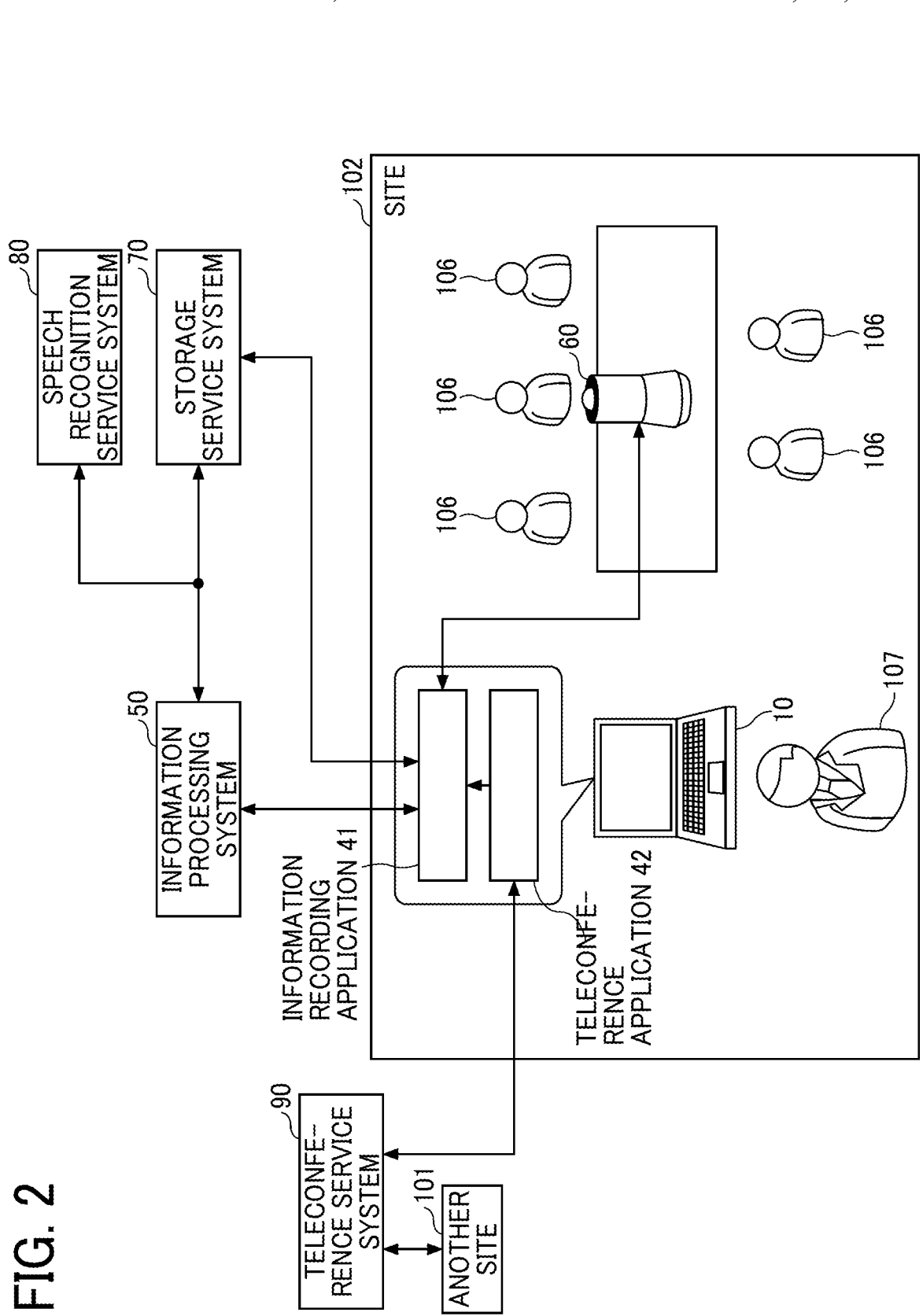
FIG. 2 is a diagram illustrating an example of a configuration of a recording information creation system, according to an embodiment of the present disclosure.

A description is now given of a system configuration of the recording information creation system 100 according to the present embodiment with reference to FIG. 2. FIG. 2 illustrates an example of the configuration of the recording information creation system 100.

FIG. 2 illustrates one site (the own site 102) among multiple sites between which a teleconference is held. The terminal apparatus 10 at the own site 102 communicates with the information processing system 50, the storage service system 70, and the teleconference service system 90 through a network. Further, in the own site 102, the meeting device 60 is provided. The terminal apparatus 10 is communicably connected to the meeting device 60 via a universal serial bus (USB) cable, for example.

At least the information recording application 41 and the teleconference application 42 operate on the terminal apparatus 10. The teleconference application 42 can communicate with the terminal apparatus at the other site 101 via the teleconference service system 90 that resides on the network to allow users at the remote sites to participate in the teleconference. The information recording application 41 uses functions of the information processing system 50 and the meeting device 60 to create recording information in the teleconference performed by the teleconference application 42.

In the present embodiment, a description is given of an example in which recording information during a teleconference is created. However, in another example, the conference is not necessarily conducted between sites at remote places. In other words, the conference may be a conference in which users at one site participate. In this case, processes performed by the information recording application 41 are substantially the same as that of the teleconference held between the sites at remote places, except that audio collected by the meeting device 60 is stored without being combined.

The terminal apparatus 10 includes a built-in camera having an ordinary angle of view. In another example, instead of or in addition to the built-in camera, an external camera connectable to the terminal apparatus is provided. The camera captures an image of a front space including a user 107 who operates the terminal apparatus 10. Such a camera having an ordinary angle of view captures images that are not panoramic images. In the present embodiment, the built-in camera having the ordinally angle of view primarily captures flat images that are not curved images such as spherical images. The terminal apparatus 10 further includes a built-in microphone. In another example, instead of or in addition to the built-in microphone, an external microphone connectable to the terminal apparatus is provided. The microphone collects audio around, for example, the user who operates the terminal apparatus 10. Thus, the user can participate in a teleconference using the teleconference application 42 as usual without worrying about the information recording application 41. The information recording application 41 and the meeting device 60 do not affect the teleconference application 42 except for an increase in the processing load on the terminal apparatus 10.

The information recording application 41 is an application that records information by communicating with the meeting device 60 to create recording information. The meeting device 60 is a device for a meeting, including an imaging device that can capture a panoramic image, a microphone, and a speaker. The camera of the terminal apparatus 10 captures an image of only a limited range of the front space. In contrast, the meeting device 60 captures an image of the entire surroundings around the meeting device 60. The image captured by the meeting device 60 is not necessarily the entire surroundings. The meeting device 60 can always keep multiple participants 106 illustrated in FIG. 2 within the angle of view.

Further, the meeting device 60 clips a talker image from a panoramic image and combines audio data acquired by the meeting device 60 and audio data to be output by the terminal apparatus 10 (including audio data received by the teleconference application 42). The place where the meeting device 60 is installed is not limited to on an installation location such as a desk or a table, and the meeting device 60 can be placed anywhere in the own site 102. Since the meeting device 60 can capture a spherical image, the meeting device 60 is installed, for example, on a ceiling. In another example, the meeting device 60 is installed at a different site or at any site.

The information recording application 41 displays a list of applications being executed on the terminal apparatus 10, combines images for the above-described recording information (creates the composite moving image), reproduces the combined moving image, and receives editing. Further, the information recording application 41 displays a list of teleconferences already held or are to be held in the future. The list of teleconferences is used for information relating to recording information. A user can associate a teleconference and the recording information with each other.

The teleconference application 42 is an application that enables the terminal apparatus to perform a remote communication with the other terminal apparatus located at the other site 101 by connecting and communicating with the other terminal apparatus, transmitting and receiving an image and audio to and from the other terminal apparatus, and displaying the image and outputting the audio. The teleconference application may also be referred to as, for example, a remote communication application, and a remote information sharing application.

Each of the information recording application 41 and the teleconference application 42 is either a web application or a native application. The web application is an application in which a program on a web server and a program on a web browser or a native app cooperate with each other to perform processing. The web application does not need to be installed in the terminal apparatus 10. The native application is an application that is installed in the terminal apparatus 10 for use. In the present embodiment, the information recording application 41 and the teleconference application 42 are assumed to be native applications.

The terminal apparatus 10 is, for example, a general-purpose information processing apparatus having a communication capability, such as a personal computer (PC), a smartphone, or a tablet terminal. Additionally, the terminal apparatus 10 is, for example, an electronic whiteboard, a game console, a personal digital assistant (PDA), a wearable PC, a car navigation system, an industrial machine, a medical device, or a networked home appliance. Any suitable apparatus can be used as the terminal apparatus 10, provided that the information recording application 41 and the teleconference application 42 operate on the apparatus.

The information processing system 50 includes one or more information processing apparatuses residing on a network. The information processing system 50 includes one or more server application that perform processing in cooperation with the information recording application 41, and provides basic services. The one or more server applications manage a list of teleconferences, recording information recorded during a teleconference, various settings, and path information of storages.

Examples of the basic services include, but are not limited to, user authentication, processing of contracting, and processing of charging.

All or some of the functions of the information processing system 50 reside either in a cloud environment or in an on-premises environment. The information processing system 50 may be implemented by multiple server apparatuses or may be implemented by a single information processing apparatus. For example, the one or more server applications and the basic services are respectively provided by different information processing apparatuses. Further, for example, the functions of the sever application are provided by respective information processing apparatuses. The information processing system 50 may be integral with the storage service system 70 and the speech recognition service system 80 described below.

The storage service system 70 is storage means on a network and provides a storage service for accepting storage of files and the like. OneDrive®, Google Workspace®, and Dropbox® are known as the storage service system 70. The storage service system 70 is, for example, a network-attached storage (NAS) in an on-premises environment.

The speech recognition service system 80 provides a service for converting audio data into text data by performing speech recognition on the audio data. The speech recognition service system 80 is, for example, a general-purpose commercial service. In another example, the speech recognition service system 80 is a part of functions of the information processing system 50. As the speech recognition service system 80, different service systems may be set and used respectively for different users or tenants or different conferences.

Example of Hardware Configuration

Figure 3:
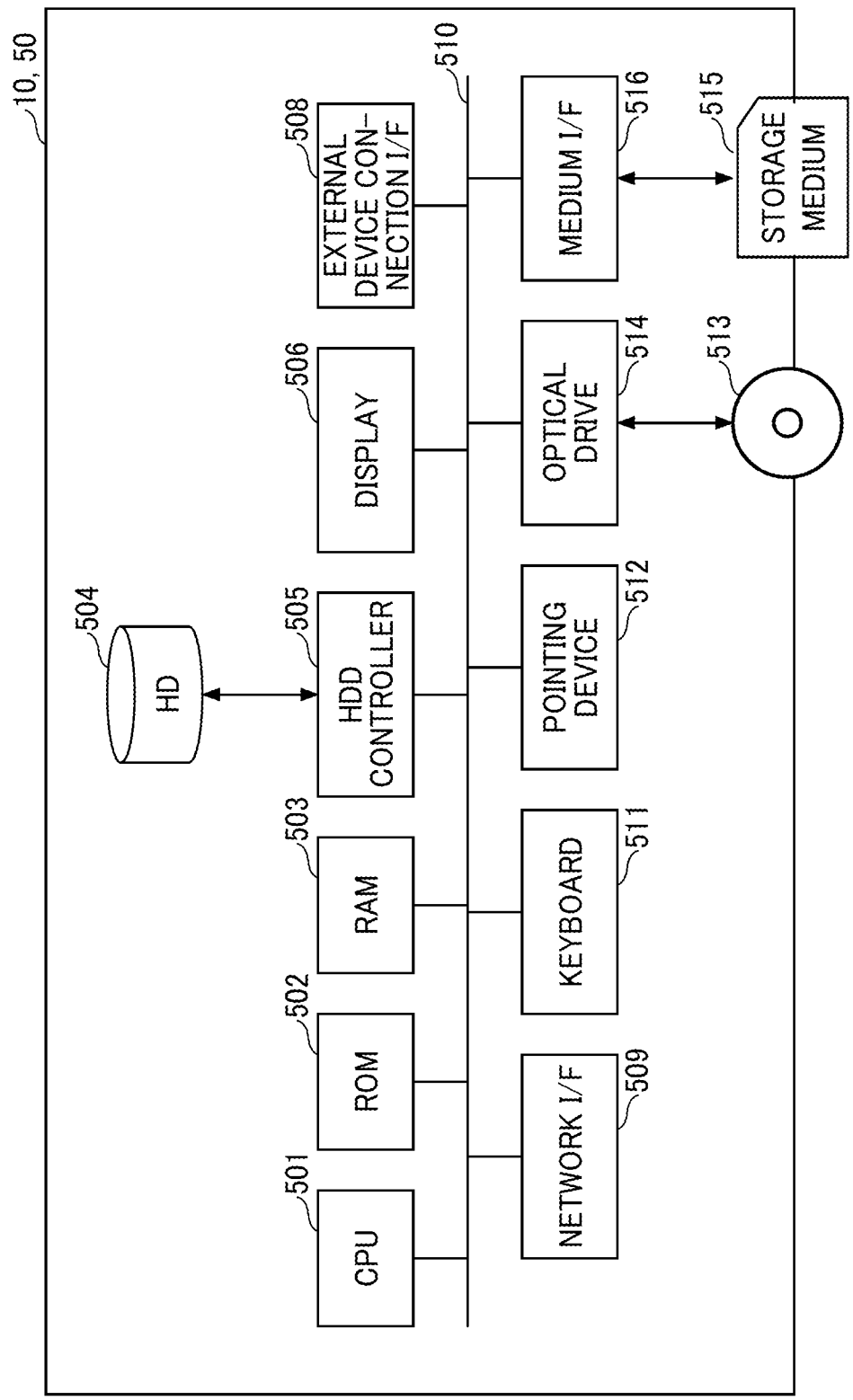
FIG. 3 is a diagram illustrating an example of a hardware configuration of each of an information processing system and a terminal apparatus, according to an embodiment of the present disclosure.

A description is now given of hardware configurations of the information processing system 50 and the terminal apparatus 10 according to the present embodiment with reference to FIG. 3.

Information Processing System and Terminal Apparatus

FIG. 3 is a block diagram illustrating an example of a hardware configuration of each of the information processing system 50 and the terminal apparatus 10, according to the present embodiment. As illustrated in FIG. 3, the information processing system 50 and the terminal apparatus 10 each are implemented by a computer. The computer includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

The CPU 501 controls overall operation of the information processing system 50 and the terminal apparatus 10. The ROM 502 stores programs such as an initial program loader (IPL) to boot the CPU 501. The RAM 503 is used as a work area for the CPU 501. The HD 504 stores various data such as a control program. The HDD controller 505 controls reading or writing of various data with respect to the HD 504 under control of the CPU 501. The display 506 displays various information such as a cursor, a menu, a window, characters, or an image. The external device connection I/F 508 is an interface for connecting the computer to various external devices. Examples of the external devices include, but are not limited to, a universal serial bus (USB) memory and a printer. The network I/F 509 is an interface for performing data communication using a network. The bus line 510 is, for example, an address bus or a data bus, which electrically connects the components illustrated in FIG. 3, such as the CPU 501.

The keyboard 511 is an example of an input device (input means) including a plurality of keys used to input characters, numerals, or various instructions, for example. The pointing device 512 is an example of an input device (input means) that allows a user to select or execute various instructions, select an item to be processed, or move a cursor being displayed. The optical drive 514 controls reading or writing of various data with respect to an optical storage medium 513, which is an example of a removable storage medium.

Examples of the optical storage medium 513 include, but are not limited to, a compact disk (CD), a digital versatile disk (DVD), and Blu-ray® disk. The medium I/F 516 controls reading or writing (storing) of data with respect to a storage medium 515 such as a flash memory.

Meeting Device

Figure 4:
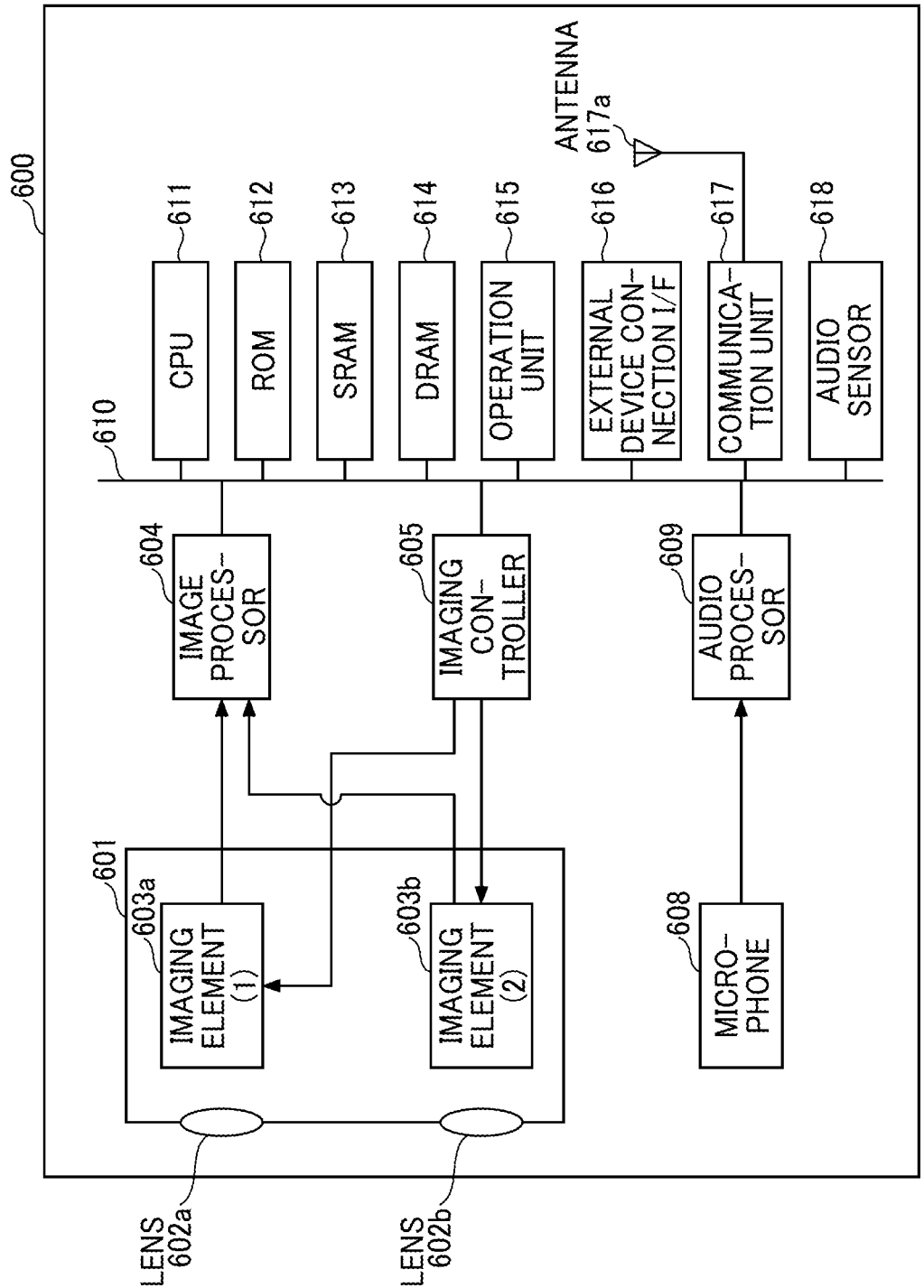
FIG. 4 is a diagram illustrating an example of a hardware configuration of a meeting device, according to an embodiment of the present disclosure.

A description is now given of a hardware configuration of the meeting device 60 with reference to FIG. 4. FIG. 4 is a block diagram illustrating an example of a hardware configuration of the meeting device 60 that can capture a moving image of surroundings at 360 degrees, according to the present embodiment. In the following description, the meeting device 60 is assumed to be a device that uses an imaging element to capture the moving image of surroundings at 360 degrees of the device at a predetermined height. The number of imaging elements may be one or two or more. The meeting device 60 is not necessarily a dedicated device. In another example, an external imaging unit that can capture a moving image of surroundings at 360 degrees is attached to a PC, a digital camera, or a smartphone to implement a meeting device having substantially the same functions as those of the meeting device 60.

As illustrated in FIG. 4, the meeting device 60 includes an imaging unit 601, an image processor 604, an imaging controller 605, a microphone 608, an audio processor 609, a CPU 611, a ROM 612, a static random access memory (SRAM) 613, a dynamic random access memory (DRAM) 614, an operation unit 615, an external device connection I/F 616, a communication unit 617, an antenna 617a, an audio sensor 618, and a terminal 621 for Micro-USB, the terminal having a concave shape.

The imaging unit 601 includes so-called fisheye lens 602a and 602b each being a wide-angle lens, and imaging elements 603a and 603b (image sensors) respectively corresponding to the fisheye lenses. Each of the fisheye lenses 602a and 603b has an angle of view of 360 degrees so as to form a hemispherical image. In the following description, the fisheye lenses 602a and the 602b may be collectively referred as "fisheye lenses 602". Further, in the following description, the imaging elements 603a and 603b may be collectively referred to as "imaging elements 603." Each of the imaging elements 603 includes an imaging sensor such as a complementary metal oxide semiconductor (CMOS) sensor and a charge-coupled device (CCD) sensor, a timing generation circuit, and a group of registers. The imaging sensor converts an optical image formed by the fisheye lenses 602 into electric signals to output image data. The timing generation circuit generates horizontal or vertical synchronization signals, pixel clocks and the like for the imaging sensor. Various commands, parameters and the like for operations of the imaging elements 603 are set in the group of registers. The imaging unit 601 is, for example, a 360-degree camera. The imaging unit 601 is an example of imaging means that can capture an image of surroundings at 360 degrees around the meeting device 60. In another example, multiple data items acquired respectively by multiple imaging elements (e.g., two imaging elements each outputting a 180-degree image data) are combined to obtain an image of an angle of view of 360 degrees.

Each of imaging elements 603 (image sensors) of the imaging unit 601 is connected to the image processor 604 via a parallel I/F bus. In addition, the imaging elements 603 of the imaging unit 601 are connected to the imaging controller 605 via a serial I/F bus such as an I2C bus. Each of the image processor 604, the imaging controller 605, and the audio processor 609 is connected to the CPU 611 via a bus 610. The ROM 612, the SRAM 613, the DRAM 614, the operation unit 615, the external device connection I/F 616, the communication unit 617, and the audio sensor 618 are also connected to the bus 610.

The image processor 604 acquires image data output from each of the imaging elements 603 through the parallel I/F bus and performs predetermined processing on the acquired image data to create data of a panoramic image and data of a talker image from fisheye video. Further, the image processor 604 combines the panoramic image and the talker image to output one moving image.

The imaging controller 605 usually functions as a master device while the imaging elements 603 each usually functions as a slave device. The imaging controller 605 sets commands and the like in the group of registers of each of the imaging elements 603 via the I2C bus. The imaging controller 605 receives necessary commands and the like from the CPU 611. Further, the imaging controller 605 acquires status data of the group of registers of the imaging elements 603 also via the I2C bus and transmits the status data to the CPU 611.

Further, the imaging controller 605 instructs the imaging element 603a and the imaging element 603b to output image data at a timing when an imaging start button of the operation unit 615 is pressed or at a timing when an instruction to start imaging is received from the PC. In some cases, the meeting device 60 has functions that support a preview display function and a moving image display function by a display (e.g., the display of the PC or the smartphone). In this case, image data are continuously output from the imaging elements 603 at a predetermined frame rate (frames per minute).

Furthermore, as described below, the imaging controller 605 operates in cooperation with the CPU 611 to synchronize the time when the imaging element 603a outputs image data and the time when the imaging element 603b outputs image data. In the present embodiment, the meeting device 60 does not include a display. However, in another example, the meeting device 60 can include a display.

The microphone 608 converts audio into audio (signal) data. The audio processor 609 acquires the audio data output from the microphone 608 via an I/F bus and performs predetermined processing on the audio data.

The CPU 611 controls overall operation of the meeting device 60 and performs necessary processing. The ROM 612 stores various programs for execution by the CPU 611.

The SRAM 613 and the DRAM 614 each operates as a work memory to store programs for execution by the CPU 611 or data in current processing. Specifically, in one example, the DRAM 614 stores image data currently processed by the image processor 604 and data of the equirectangular projection image on which processing has been performed.

The operation unit 615 collectively refers to various operation keys, such as a the imaging start button. The user operates the operation unit 615 to start imaging and recording. In addition, the user operates the operation unit 615 to turn on or off the meeting device 60, to establish a connection for communication, and to input settings such as various imaging modes and imaging conditions.

The external device connection I/F 616 is an interface for connection with various external devices. Examples of the external devices in this case include, but are not limited to, a PC, a display, a projector, and an electronic whiteboard. The external device connection I/F 616 may include, for example, a USB terminal and/or a High-Definition Multimedia Interface (HDMI®) terminal. Moving image data and image data stored in the DRAM 614 are transmitted to an external terminal or recorded in an external medium via the external device connection I/F 616. Further, a plurality of external device I/Fs 616 may be used to. In this case, while the meeting device 60 transmits image information captured and acquired by the meeting device 60 to a PC via USB to cause the image information to be recorded in the PC, the meeting device 60 acquires video (e.g., screen information representing a screen to be displayed by the teleconference application) from the PC, and further transmits the video to another external devices (e.g., a display, a projector, or an electronic whiteboard) via HDMI to cause the video to be displayed at the other external device.

In one example, the communication unit 617 communicates with a cloud server through the Internet using a wireless communication technology such as Wireless Fidelity (Wi-Fi) via the antenna 617a provided in the meeting device 60, to transmit the stored moving image data and image data to the cloud server. In another example, the communication unit 617 communicates with nearby devices using a short-range wireless communication technology such as Bluetooth Low Energy (BLE®) or the near-field wireless communication network (NFC).

The audio sensor 618 is a sensor that acquires 360-degree audio information in order to identify the direction from audio of large volume is input within a 360-degree space (on a horizontal plane) around the meeting device 60. The audio processor 609 identifies a direction in which the volume of the audio is highest on the basis of the input 360-degree audio parameter, and outputs the direction from which the audio is input within the 360-degree space.

In one example, another sensor such as an azimuth/acceleration sensor or a global positioning system calculates an azimuth, a position, an angle, an acceleration, or the like and use the calculated azimuth, position, angle, acceleration, or the like in image correction or addition of position information.

The image processor 604 also performs the following processing.

The CPU 611 creates a panoramic image in the following method. The CPU 611 performs predetermined camera image processing such as Bayer conversion (RGB interpolation processing) on raw data input from the image sensor that input a spherical video, to create a fisheye image (a video including curved-surface images). Further, the CPU 611 performs flattening processing such as dewarping processing (distortion correction processing) on the created fisheye video (curved-surface video) to create a panoramic image (video including flat-surface images) representing a 360-degree space around the meeting device 60.

The CPU 611 creates a talker image in the following method. The CPU 611 clips a portion including a talker from the panoramic image (video including flat-surface images) representing the 360-degree surrounding space to create a talker image. The CPU 611 identifies the direction of the input audio identified from the audio of the surroundings at 360 degrees using the audio sensor 618 and the audio processor 609 as a direction of a talker and cuts out a talker image from the panoramic image.

Specifically, the CPU 611 clips a 30-degree portion around the audio input direction identified from the 360-degree surrounding space and performs face detection on the 30-degree portion, to clip the talker image on the basis of the audio input direction. The CPU 611 further identifies talker images of a specific number of persons (e.g., three persons) who have most recently spoken among the clipped talker images.

In one example, the panoramic image and the one or more talker images are individually transmitted to the information recording application 41. In another example, the meeting device 60 creates one image from the panoramic image and the one or more talker images and transmit the one image to the information recording application 41. In the present embodiment, it is assumed that the panoramic image and the one or more talker images are individually transmitted from the meeting device 60 to the information recording application 41.

Figure 5B:
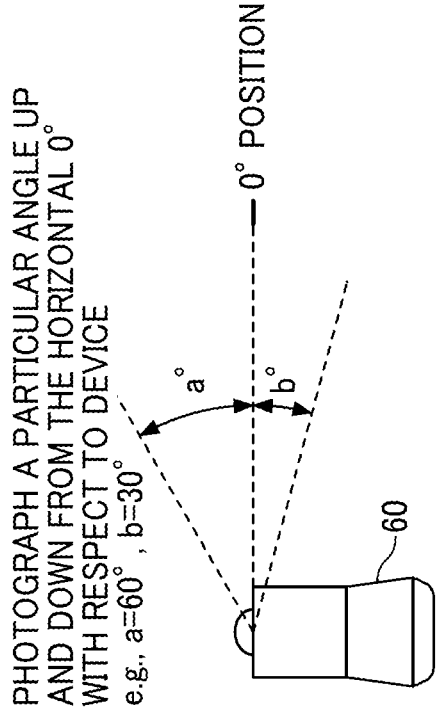
FIG. 5A and FIG. 5B are illustrations for describing an imaging range of the meeting device, according to an embodiment of the present disclosure.
Figure 5A:
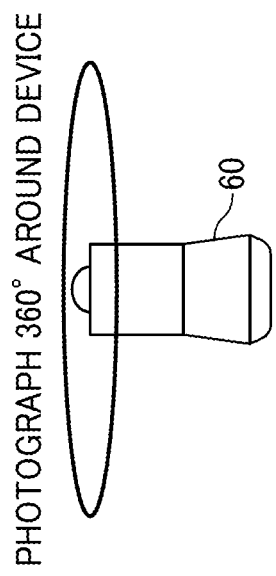

FIG. 5A and FIG. 5B are illustrations for describing an imaging range of the meeting device 60. As illustrated in FIG. 5A, the meeting device 60 captures an image of a range of 360 degrees in the horizontal direction. As illustrated in FIG. 5B, the meeting device 60 captures an image at predetermined angles up and down with a direction horizontal to the height of the meeting device 60 as 0 degree.

FIG. 6 is an illustration for describing a panoramic image and clipping of talker images. As illustrated in FIG. 6, an image captured by the meeting device 60 forms a part 110 of a sphere, and thus has a three-dimensional shape. As illustrated in FIG. 5B, the meeting device 60 divides angles of view at the predetermined degrees up and down and at the predetermined angle in the horizontal direction to perform perspective projection transformation on each of the angles of view. A predetermined number of flat images are obtained by thoroughly performs perspective projection transformation on the entire 360-degree range in the horizontal direction. Thus, a panoramic image 111 is obtained by laterally connecting the predetermined number of flat images together. Further, the meeting device 60 performs face detection on a predetermined range around the sound direction in the panoramic image 111, and clips 15-degree leftward and rightward ranges from the center of the face (i.e., a 30-degree range in total) to create talker images 112.

Functions

Figure 7:
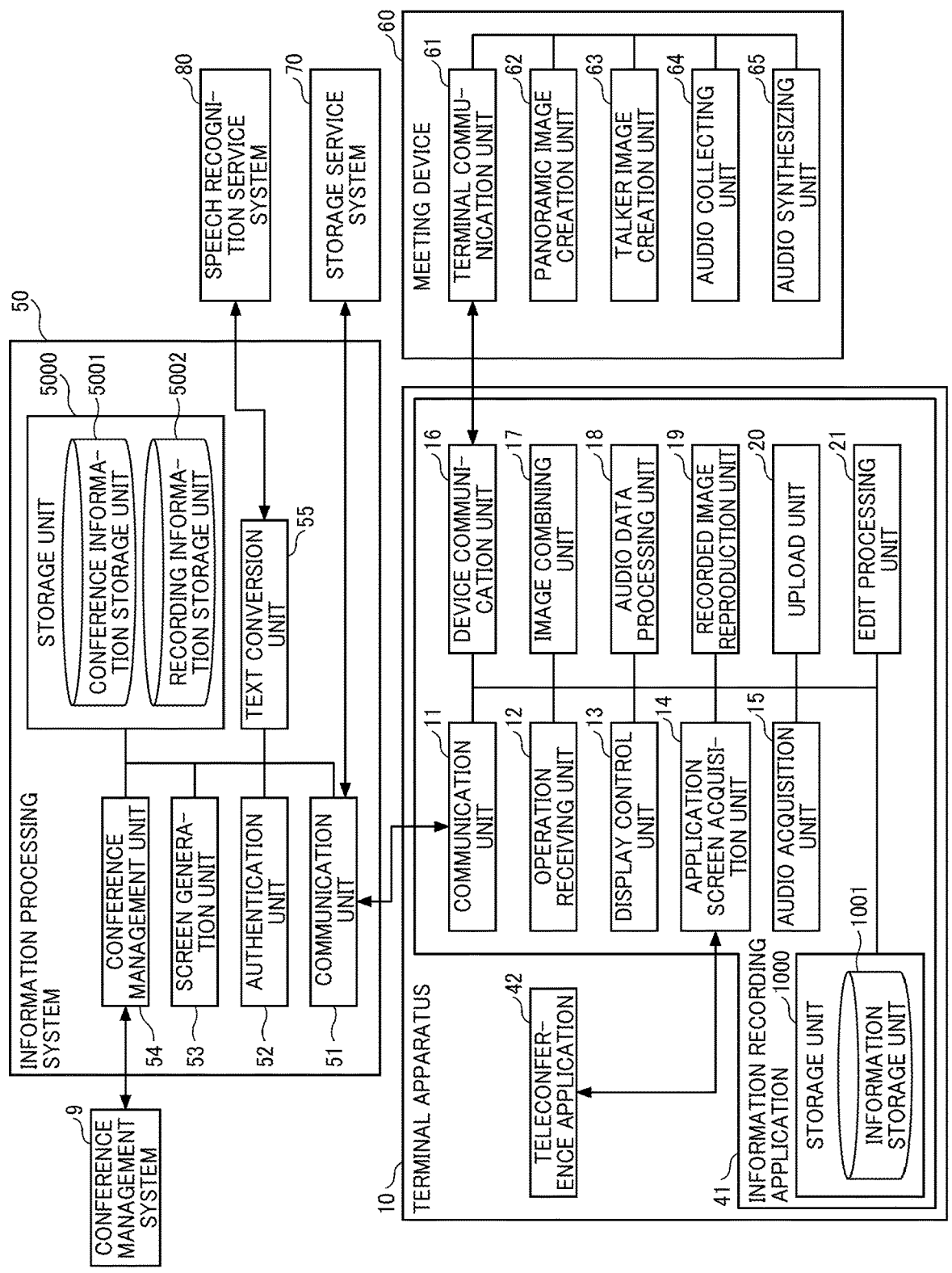
FIG. 7 is a diagram illustrating an example of functional configurations of the terminal apparatus, the meeting device, and the information processing system of the recording information creation system, according to an embodiment of the present disclosure.

A description is now given of a functional configuration of the recording information creation system 100 with reference to FIG. 7. FIG. 7 is a block diagram illustrating an example of functional configurations of the terminal apparatus 10, the meeting device 60, and the information processing system 50 of the recording information creation system 100, according to the present embodiment.

Terminal Apparatus

The information recording application 41 operating on the terminal apparatus 10 includes a communication unit 11, an operation receiving unit 12, a display control unit 13, an application screen acquisition unit 14, an audio acquisition unit 15, a device communication unit 16, an image combining unit 17, an audio data processing unit 18, a recorded image reproduction unit 19, an upload unit 20, and an edit processing unit 21. These units of the terminal apparatus 10 are functions or means implemented by or caused to function by operating one or more hardware components illustrated in FIG. 3 in cooperation with instructions of the CPU 501 according to the information recording application 41 loaded from the HD 504 to the RAM 503.

The terminal apparatus 10 further includes a storage unit 1000 implemented by, for example, the HD 504 illustrated in FIG. 3. The storage unit 1000 includes an information storage unit 1001.

The communication unit 11 communicates various information with the information processing system 50 through a network.

For example, the communication unit 11 receives a list of teleconferences from the information processing system 50 and transmits an audio data recognition request to the information processing system 50.

The display control unit 13 displays various screens serving as user interfaces in the information recording application 41, in accordance with screen transitions set in the information recording application 41. The operation receiving unit 12 receives various operations performed with respect to the information recording application 41.

The application screen acquisition unit 14 acquires, screen information to be displayed by an application selected by a user or screen information of a desktop screen from an operating system (OS), for example. When the application selected by the user is the teleconference application 42, the application screen acquisition unit 14 acquires a screen generated by the teleconference application 42. The screen generated by the teleconference application 42 includes, for example, an image including a captured image of a user of the terminal apparatus captured by a camera of the terminal apparatus at each site, a display image of a shared document, participant icons, and participant names. The screen information (application screen) displayed by the application is information displayed as a window by an application being executed including the teleconference application and acquired as an image by the information recording application. The window of the application is displayed on a monitor such that the area of the window is rendered as an area in the entire desktop image. The screen information displayed by the application is acquirable by another application (e.g., the information recording application) as an image file or a moving image file including a plurality of consecutive images via an application programming interface (API) of the OS or an API of the application displaying the screen. The screen information of the desktop screen is information including an image of the desktop screen generated by the OS. In substantially the same manner as the screen information displayed by the application, the screen information of the desktop screen can be acquired as an image file or a moving image file via an API of the OS. The format of these image files is, for example, bitmap, Portable Network Graphics (PNG), or any other format. The format of the moving image file is, for example, MP4 or any other format.

The audio acquisition unit 15 acquires audio to be output from a microphone or an earphone by the terminal apparatus 10. The audio also includes audio data received from the teleconference application 42 during the teleconference. Even when the output audio is muted, the audio acquisition unit 15 can acquire the audio. With regard to the audio data, the user does not have to perform an operation such as selecting the teleconference application 42. The audio acquisition unit 15 can acquire audio to be output by the terminal apparatus 10 via an API of the OS or an API of the application. Thus, the audio data received by the teleconference application 42 from the other site 101 is also acquired. When the teleconference application 42 is not being executed or a teleconference is not being held, the information recording application 41 may fail to acquire the audio data. In another example, the audio acquired by the audio acquisition unit 15 is the audio data to be output, without including the audio collected by the terminal apparatus 10. This is because the meeting device 60 separately collects the audio at the site.

The device communication unit 16 communicates with the meeting device 60 via a USB cable, for example. In another example, the device communication unit 16 communicates with the meeting device 60 via a wireless local area network (LAN) or Bluetooth®. The device communication unit 16 receives the panoramic image and the talker image from the meeting device 60, and transmits the audio data acquired by the audio acquisition unit 15 to the meeting device 60. The device communication unit 16 receives audio data combined by the meeting device 60.

The image combining unit 17 combines the panoramic image and the talker image received by the device communication unit 16 and the screen of the application acquired by the application screen acquisition unit 14 together to create a combined image. Further, the image combining unit 17 connects, in chronological order, combined images repeatedly created to generate a composite moving image, and further combines the combined audio data and the composite moving image to generate a composite moving image with audio. In another example, the meeting device 60 combines the panoramic image and the talker image. In another example, a panoramic moving image including multiple panoramic images, a speaker moving image including multiple talker images, an application screen moving image including multiple application screens, and a combined moving image including multiple panoramic images and multiple talker images are stored in the storage service system 70 as individual moving image files. In this case, for example, the panoramic moving image, the talker moving image, the application screen moving image, or the combined moving image of the panoramic images and the talker images is called and displayed on one display screen when being viewed.

The audio data processing unit 18 extracts audio data combined with the composite moving image, or requests the information processing system 50 to convert the combined audio data received from the meeting device 60 into text data.

The recorded image reproduction unit 19 reproduces the composite moving image. The composite moving image is stored in the terminal apparatus 10 during recording, and then uploaded to the information processing system 50.

After the teleconference ends, the upload unit 20 transmits the composite moving image to the information processing system 50.

The edit processing unit 21 edits (e.g., deletes a part, connects parts) the composite moving image according to a user operation.

FIG. 8 is a table of an example of data structure of image recording information stored in the information storage unit 1001. The moving image recording information includes items of "conference ID," "recording ID," "update date/time," "title," "upload," and "storage location." When a user logs into the information processing system 50, the information recording application 41 downloads conference information from a conference information storage unit 5001 of the information processing system 50. The conference ID included in the conference information is reflected in the moving image recording information. The moving image recording information in FIG. 8 is held by the terminal apparatus 10 operated by a certain user.

The item "conference ID" is identification information for identifying a held teleconference. The conference ID is assigned when a schedule of a teleconference is registered to a conference management system 9, or is assigned by the information processing system 50 in response to a request from the information recording application 41. The conference management system 9 is a system to which a schedule of a conference and a teleconference, a uniform resource locator (URL) such as a link to a teleconference for starting a teleconference, and reservation information of a device to be used in a conference or a teleconference are registered. In other words, the conference management system 9 is, for example, a scheduler to which the terminal apparatus 10 connects through a network. Further, the conference management system 9 can transmit the registered schedule to the information processing system 50.

The item "recording ID" is identification information for identifying a composite moving image recorded in the teleconference.

The recording ID is assigned by the meeting device 60. In another example, the information recording application 41 or the information processing system 50 assigns the recording ID. Different recording IDs are assigned for the same conference ID when the recording is suspended in the middle of the teleconference and is started again for some reason.

The item "update date/time" is a date and time when a composite moving image is updated (or recording is ended). When the composite moving image is edited, the update date/time is a date and time when the editing is performed.

The item "title" is a name of a conference. In one example, the title is set when the conference is registered to the conference management system 9. In another example, a user sets a desired title.

The item "upload" indicates whether a composite moving image is uploaded to the information processing system 50.

The item "storage location" indicates a location (e.g., an URL, a file path) where a composite moving image and text data are stored in the storage service system 70. Thus, the user can view the uploaded composite moving image as desired. The composite moving image and the text data are stored with different file names starting with the same URL, for example.

Meeting Device

Referring again to FIG. 7, the functional configuration is described. The meeting device 60 includes a terminal communication unit 61, a panoramic image creation unit 62, a talker image creation unit 63, an audio collecting unit 64, and an audio synthesizing unit 65. These units of the meeting device 60 are functions or means implemented by or caused to function by operating one or more hardware components illustrated in FIG. 4 in cooperation with instructions of the CPU 611 according to the program loaded from the ROM 612 to the DRAM 614.

The terminal communication unit 61 communicates with the terminal apparatus 10 using a USB cable, for example. In another example, the terminal communication unit 61 communicates with the terminal apparatus 10 using a wireless LAN or Bluetooth®.

The panoramic image creation unit 62 creates a panoramic image. The talker image creation unit 63 creates a talker image. The methods of creating the panoramic image and the talker image are already described with reference to FIG. 5A, FIG. 5B, and FIG. 6.

The audio collecting unit 64 converts an audio signal acquired by the microphone 608 of the meeting device 60 into audio data (digital data). Thus, contents spoken by the user and the participants at a site where the terminal apparatus 10 is located are collected.

The audio synthesizing unit 65 combines the audio transmitted from the terminal apparatus 10 and the audio collected by the audio collecting unit 64. Thus, the audio spoken at the other site 101 and the contents spoken at the own site 102 are combined.

Information Processing System

The information processing system 50 includes a communication unit 51, an authentication unit 52, a screen generation unit 53, a conference management unit 54, and a text conversion unit 55. These units of the information processing system 50 are functions or means implemented by or caused to function by operating one or more hardware components illustrated in FIG. 3 in cooperation with instructions of the CPU 501 according to the program loaded from the HD 504 to the RAM 503. The information processing system 50 further includes a storage unit 5000 implemented by, for example, the HD 504 illustrated in FIG. 3. The storage unit 5000 includes a conference information storage unit 5001 and a recording information storage unit 5002.

The communication unit 51 transmits and receives various information to and from the terminal apparatus 10. For example, the communication unit 51 transmits a list of teleconferences to the terminal apparatus 10, and receives an audio data recognition request from the terminal apparatus 10.

The authentication unit 52 authenticates a user who operates the terminal apparatus 10. For example, the authentication unit 52 authenticates a user on the basis of whether authentication information (e.g., a user ID and a password) included in an authentication request received by the communication unit 51 matches authentication information stored in advance. Other examples of the authentication information include, but are not limited to, a card number of an integrated circuit (IC) card and biometric information such as a face or a fingerprint. In another example, the authentication unit 52 uses an external authentication system or an authentication method such as Open Authorization (OAuth) to perform authentication.

The screen generation unit 53 generates screen information to be displayed by the terminal apparatus 10. When the terminal apparatus 10 executes a native application, the screen information is held by the terminal apparatus 10, and the information to be displayed is transmitted in Extensible Markup Language (XML), for example. When the terminal apparatus 10 executes a web application, the screen information is created by HyperText Markup Language (HTML), XML, Cascade Style Sheet (CSS), JavaScript®, for example.

The conference management unit 54 acquires information relating to a teleconference from the conference management system 9 by using an account of each user or a system account assigned to the information processing system 50. The conference management unit 54 acquires a list of conferences for which the user belonging to the tenant has a viewing authority. Since the conference ID is set for a teleconference, the teleconference and the recording information are associated with each other by the conference ID.

The text conversion unit 55 converts audio data requested to be converted into text data by the terminal apparatus 10 into text data using an external speech recognition service. In another example, the text conversion unit 55 performs this conversion.

FIG. 9 is a table of an example of data structure of conference information stored in the conference information storage unit 5001 and managed by the conference management unit 54. The conference management unit 54 acquires a list of teleconferences for which the user belonging to the tenant has a viewing authority using the aforementioned account. The viewing authority may be given directly from the information recording application 41 operating on the terminal apparatus 10 to the meeting information managed by the conference management unit 54.

The information on teleconferences for which the user belonging to the tenant has the viewing authority includes information on a conference created by the user and information on a conference for which the user is given the viewing authority by another user. Although in the present embodiment, a description is given of an example in which the teleconferences are held, the list of teleconferences also includes a conference held in a single conference room.

The conference information is managed with the conference ID, which is associated with items of "participant," "title" (conference name), "start date/time," "end date/time," and "location." These items are examples of the conference information, and the conference information may include other information.

The item "participant" indicates one or more persons who participate in a conference.

The item "title" indicates content of the conference such as a name of the conference or an agenda of the conference.

The item "start date/time" indicates a date and time at which the conference is scheduled to be started.

The item "end date/time" indicates a date and time at which the conference is scheduled to end.

The item "location" indicates a place where the conference is held such as a name of a conference room, a name of a branch office, or a name of a building.

As illustrated in FIG. 8 and FIG. 9, the composite moving image recorded in a conference is identified by the conference ID.

FIG. 10 is a table of an example of data structure of recording information stored in the recording information storage unit 5002. The recording information has a list of composite moving images recorded by all users belonging to the tenant. The recording information includes items of "conference ID," "recording ID," "update date/time," "title," "upload," and "storage location." The description provided with reference to FIG. 8 applies to those items. The user may enter desired storage location information, for example, on a user setting screen of the information recording application 41 of the terminal apparatus 10, so that the storage location (path information such as a URL of a cloud storage system) is stored in the recording information storage unit 5002.

Screen Transition

Figure 11:
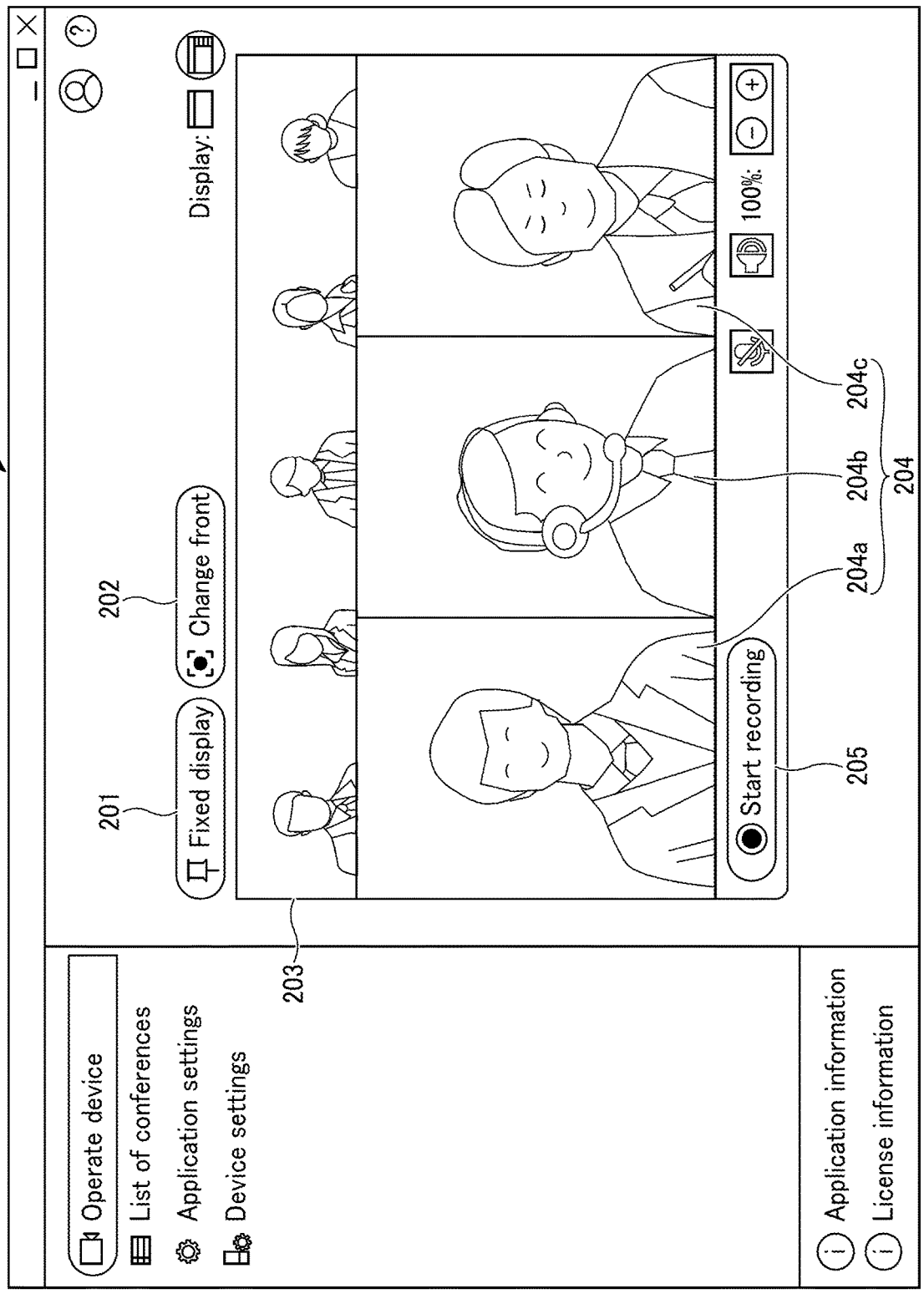
FIG. 11 is an illustration of an example of an initial screen displayed by an information recording application operating on the terminal apparatus after login, according to an embodiment of the present disclosure.

A description is now given of several screens displayed by the terminal apparatus 10 during a teleconference with reference to FIG. 11 to FIG. 20. FIG. 11 illustrates an example of an initial screen 200 displayed by the information recording application 41 operating on the terminal apparatus 10 after login. The user operates the terminal apparatus 10 to connect the information recording application 41 to the information processing system 50. The user enters authentication information, and if the login is successful, the initial screen 200 of FIG. 11 is displayed.

The initial screen 200 includes a fixed display button 201, a front change button 202, a panoramic image 203, one or more talker images 204a to 204c, and a recording start button 205. In the following description, the talker images 204a to 204c may be simply referred to as a "talker image 204" or "talker images 204", unless they need to be distinguished from each other. In a case that the meeting device 60 has already been started and is capturing an image of the surroundings at the time of the login, the panoramic image 203 and the talker images 204 created by the meeting device 60 are displayed in the initial screen 200. This allows the user to decide whether to start recording while viewing the panoramic image 203 and the talker images 204. In a case that the meeting device 60 is not started (is not capturing any image), the panoramic image 203 and the talker images 204 are not displayed.

In one example, the information recording application 41 displays the talker images 204 of all participants on the basis of all faces detected from the panoramic image 203. In another example, the information recording application 41 displays the talker images 204 of N-number of persons who have spoken most recently. FIG. 11 illustrates an example in which the talker images 204 of up to three persons are displayed. In one example, display of the talker image 204 is omitted until a participant speaks. In this case, the number of the talker images 204 increases one by one according to speech. In another example, the talker images 204 of three participants in a predetermined direction are displayed. In this case, display of the talker images 204 is switched according to speech.

When no participant is speaking such as immediately after the meeting device 60 is started, an image of a predetermined direction (such as 0 degrees, 120 degrees, or 240 degrees) of 360 degrees in the horizontal direction is created as the talker image 204. When fixed display described below is set, the setting of the fixed display is prioritized.

The fixed display button 201 is a button that allow a user to perform an operation of fixing a certain area of the panoramic image 203 as the talker image 204 in close-up.

Figure 12:
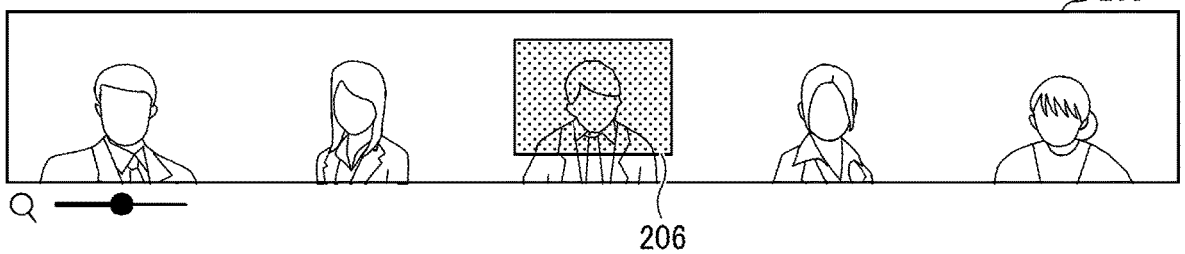
FIG. 12 is an illustration for describing how to operate when a fixed display button is on, according to an embodiment of the present disclosure.

FIG. 12 is an illustration for describing how to operate when the fixed display button 201 is on. For example, the user moves a window 206 having a rectangular shape on the panoramic image 203 with a pointing device such as a mouse or a touch panel. The user overlays the window 206 on an image of, for example, the electronic whiteboard or a podium included in the panoramic image 203. The user's operation is transmitted to the meeting device 60. The meeting device creates an image of the area selected on the window among 360 degrees in the horizontal direction in the same size as the talker image 204 and transmits the created image to the terminal apparatus 10. Thus, the talker image 204 representing an object other than a talker such as the whiteboard is continuously displayed.

Referring again to FIG. 11, the front change button 202 is a button that allows a user to perform an operation of changing the front of the panoramic image 203. The user slides the panoramic image 203 leftward or rightward with a pointing device to determine the participant who appears in front (since the panoramic image is obtained by capturing the 360-degree surrounding in the horizontal direction, the right end and the left end match as the direction). The user's operation is transmitted to the meeting device 60, and the meeting device changes the angle set as the front among 360 degrees in the horizontal direction, creates the panoramic image with the changed angle, and transmits the created panoramic image to the terminal apparatus 10.

Figure 13:
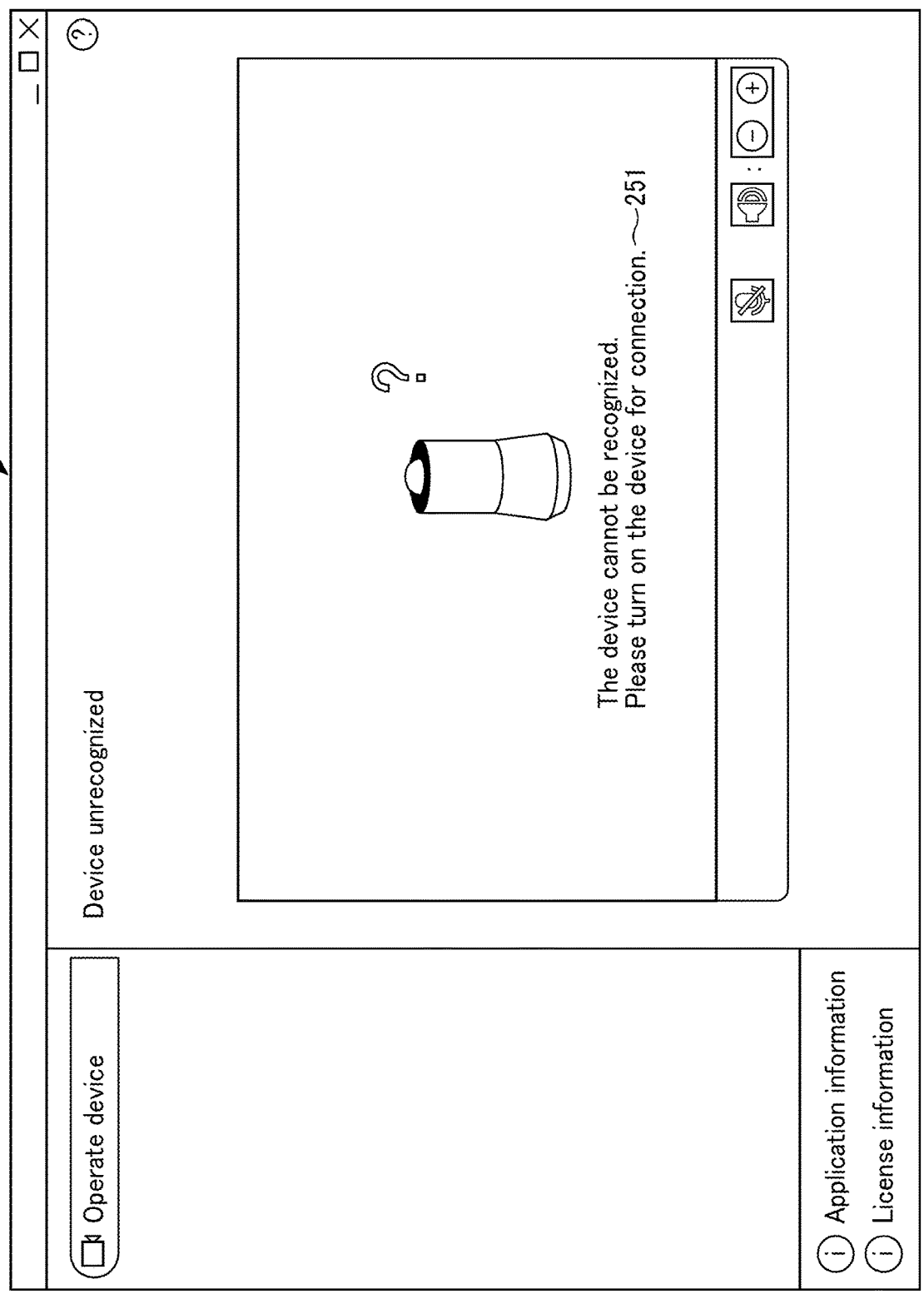
FIG. 13 is a diagram illustrating an example of a device unrecognized screen, according to an embodiment of the present disclosure.

When the meeting device 60 is not connected or is not turned on at the time of activation of the information recording application 41, a device unrecognized screen 250 of FIG. 13 is displayed.

FIG. 13 illustrates an example of the device unrecognized screen 250. The device unrecognized screen 250 displays a message 251 "The device cannot be recognized. Please turn on the device for connection." The user viewing this message checks the power supply and the connection state of the meeting device 60.

Figure 14:
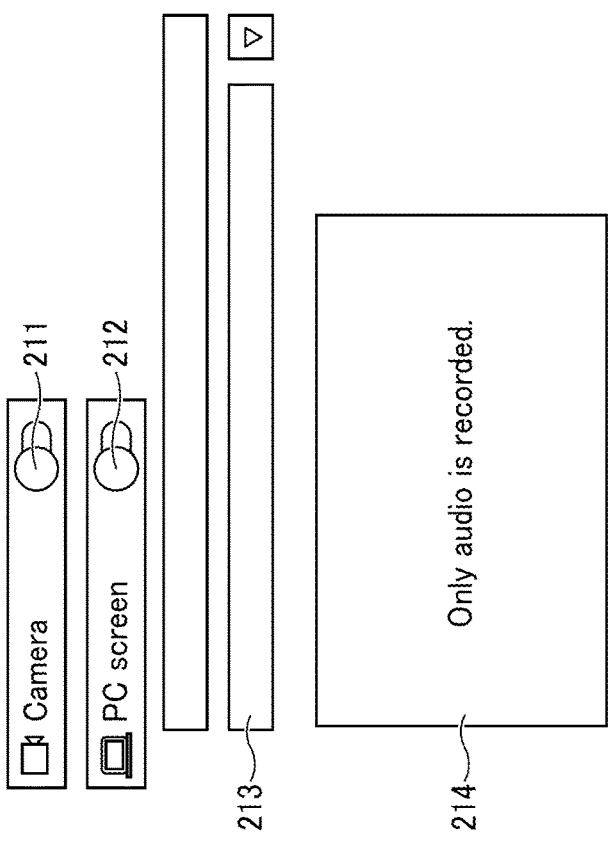
FIG. 14 is a diagram illustrating an example of a recording setting screen displayed by the information recording application, according to an embodiment of the present disclosure.

In response to pressing of the recording start button 205 by the user, the information recording application 41 displays a recording setting screen 210 of FIG. 14.

FIG. 14 illustrates an example of the recording setting screen 210 displayed by the information recording application 41. The recording setting screen 210 allows the user to configure settings of whether to record the panoramic image and the talker image created by the meeting device 60 and a desktop screen of the terminal apparatus 10 or a screen of an application operating on the terminal apparatus 10 (whether to include the images and screen in a recorded video). When the settings are configured to record none of the panoramic image, the talker image, and the desktop screen or the screen of the operating application, the information recording application 41 records audio (audio to be output by the terminal apparatus 10 and audio collected by the meeting device 60).

A camera toggle button 211 is a button for switching on and off of recording of the panoramic image and the talker image created by the meeting device 60. In another example, using the camera toggle button 211, settings can be configured for individually recording the panoramic image and the talker image.

A PC screen toggle button 212 is a button for switching on and off of recording of the desktop screen of the terminal apparatus 10 or the screen of the application operating on the terminal apparatus 10. When the PC screen toggle button 212 is on, the desktop screen is recorded.

When the user wants to record a screen of an application, the user further selects the application in an application selection field 213. The application selection field 213 displays names of applications being executed by the terminal apparatus 10 in a pull-down format. Thus, the application selection field 213 allows the user to select an application to be recorded. The information recording application 41 acquires the names of the applications from the OS. The information recording application 41 can display names of applications that have a user interface (UI) (screen) among applications being executed. The applications to be selected may include the teleconference application 42. Thus, the information recording application 41 can record, for example, a document displayed by the teleconference application 42 and the participant at each site as a moving image. The applications whose names are displayed in the pull-down format further include various applications being executed on the terminal apparatus 10 such as a presentation application, a word processor application, a spreadsheet application, a document creating and editing application for documents, a cloud electronic whiteboard application, and a web browser application. Thus, the user can flexibly select the screen of the application to be included in the composite moving image.

When recording is performed in units of applications, the user is allowed to select multiple applications. The information recording application 41 can combines the screens of all the selected applications at the time of creating a combined image.

When both the camera toggle button 211 and the PC screen toggle button 212 are set to off, a message "Only audio will be recorded" is displayed in a recording content confirmation window 214. The audio includes audio to be output from the terminal apparatus 10 (audio received by the teleconference application 42 from the other site 101) and audio collected by the meeting device 60. In other words, when a teleconference is being held, the audio of the teleconference application 42 and the audio of the meeting device 60 are stored regardless of whether the images are recorded. The user may selectively stop storing the audio of the teleconference application 42 and the audio of the meeting device 60 according to user settings.

According to a combination of on and off of the camera toggle button 211 and the PC screen toggle button 212, a composite moving image is recorded in the following manner. Further, the composite moving image is displayed in real time in the recording content confirmation window 214.

In a case that the camera toggle button 211 is on and the PC screen toggle button 212 is off, the panoramic image and the talker images captured by the meeting device 60 are displayed in the recording content confirmation window 214.

In a case that the camera toggle button 211 is off and the PC screen toggle button 212 is on (and the screen has also been selected), the desktop screen or the screen of the selected application is displayed in the recording content confirmation window 214.

In a case that the camera toggle button 211 is on and the PC screen toggle button 212 is on, the panoramic image and the talker images captured by the meeting device 60 and the desktop screen or the screen of the selected application are displayed side by side in the recording content confirmation window 214.

Thus, there is a case where the panoramic image and the talker image or the screen of the application is not combined or a case where none of the panoramic image, the talker image, and the screen of the application are recorded. However, in the present embodiment, an image created by the information recording application 41 is referred to as a combined image of a composite moving image for the sake of explanatory convenience.

Figure 15:
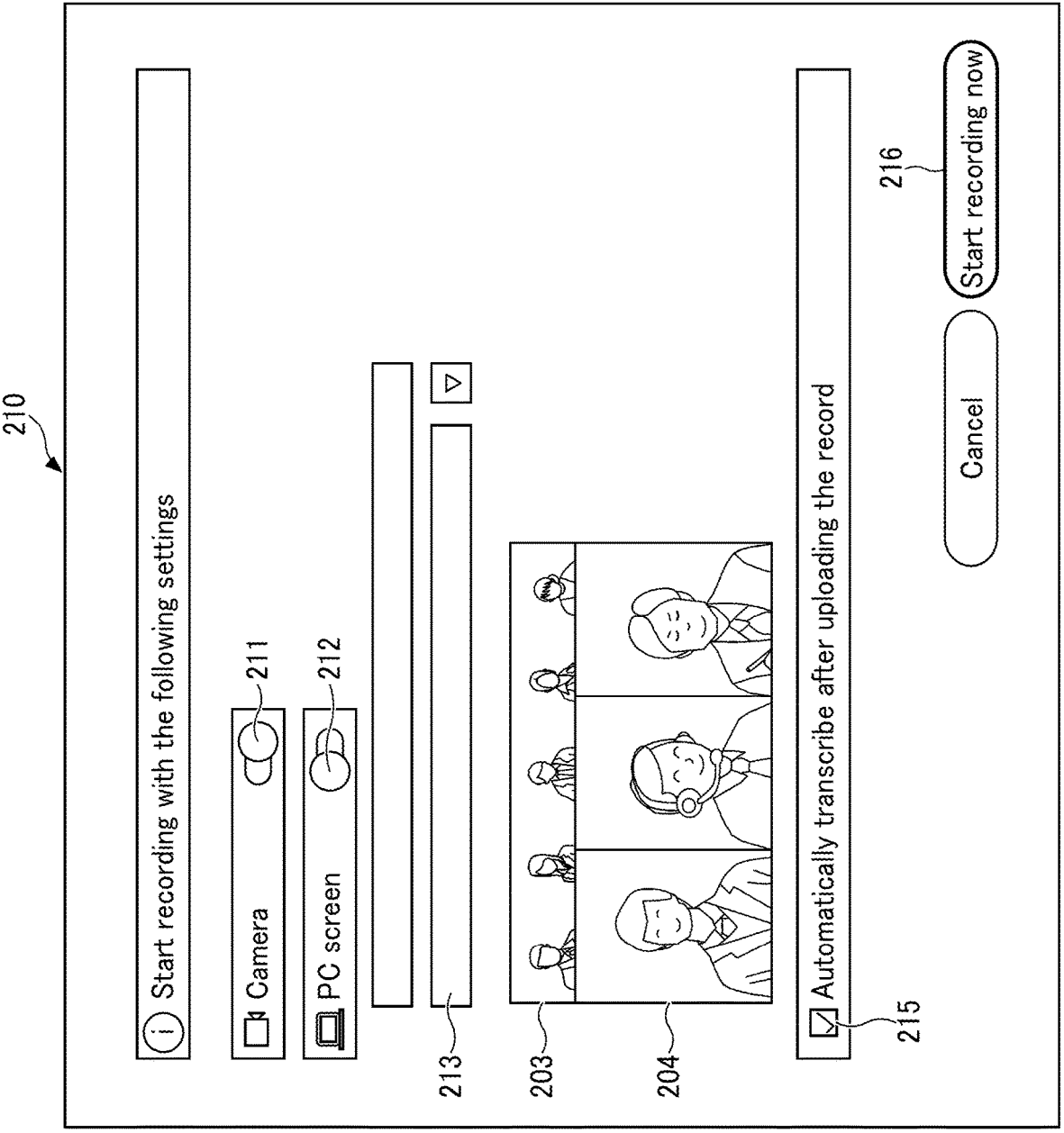
FIG. 15 is a diagram illustrating a display example of a recording content confirmation window when a camera toggle button is on and a personal computer (PC) screen toggle button is off, according to an embodiment of the present disclosure.

FIG. 15 illustrates a display example of the recording content confirmation window 214 when the camera toggle button 211 is on and the PC screen toggle button 212 is off. In FIG. 15, the panoramic image 203 and the talker image 204 are displayed large.

Figure 16:
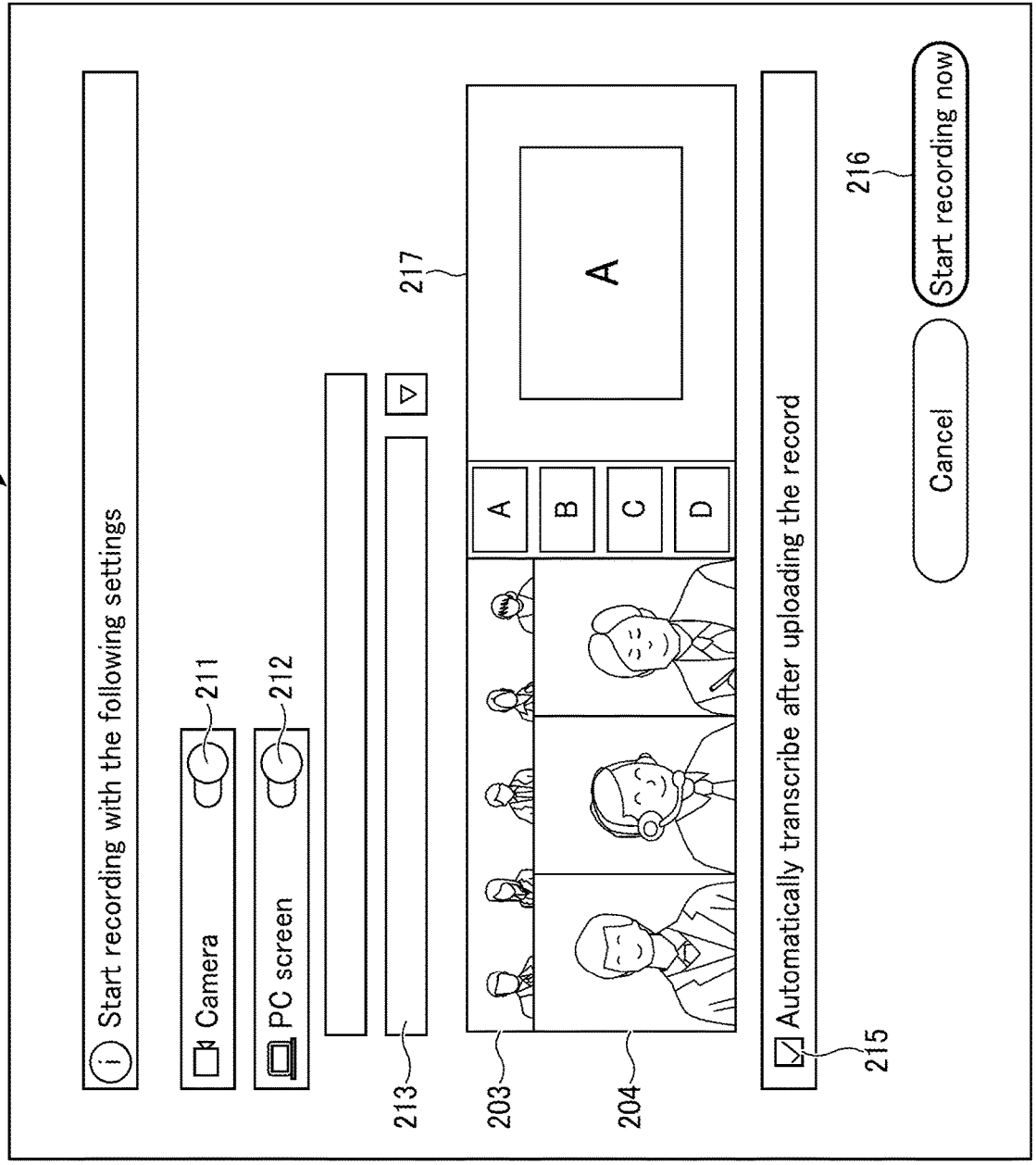
FIG. 16 is a diagram illustrating a display example of the recording content confirmation window when the camera toggle button is on and the PC screen toggle button is on, according to an embodiment of the present disclosure.

FIG. 16 illustrates a display example of the recording content confirmation window 214 when the camera toggle button 211 is on and the PC screen toggle button 212 is on. In FIG. 16, the panoramic image 203 and the talker image 204 are displayed on the left side, and an application screen 217 is displayed on the right side.

Thus, the recording content confirmation window 214 allows the user to check, before starting recording, how content of the composite moving image (particularly, an image by the meeting device 60) is to be recorded according to the settings configured on the recording setting screen 210. The information recording application 41 receives an instruction to start recording (pressing of the recording start button) in a state where the image(s) to be included in the composite moving image of the recording information is displayed. Further, the information recording application 41 acquires the screen information that is displayed by the selected application (e.g., the teleconference application) and is being displayed when the recording start instruction is given and image information representing the surroundings of the device acquired from the device, the image information being acquired when the recording start instruction is given, until a recording end instruction (pressing of a recording end button) is given. The information recording application 41 generates a combined image using the acquired screen information and image information.

FIG. 16 illustrates a display example of the composite moving image when only one application is selected. When two or more applications are selected, screens of the second and subsequent applications are sequentially connected to the right side. In another example, the screens of the second and subsequent applications are vertically and horizontally in two dimensions.

Referring again to FIG. 14, a further description is given below. The recording setting screen 210 includes a check box 215 with a message "Automatically transcribe after uploading the record." The recording setting screen 210 further includes a start recording now button 216. When the user puts a mark in the check box 215, text data converted from speech made during the teleconference is attached to the composite moving image. In this case, after the end of recording, the information recording application 41 uploads audio to the information processing system 50 together with a text data conversion request. In response to pressing of the start recording now button 216 by the user, a recording-in-progress screen 220 of FIG. 17 is displayed.

Figure 17:
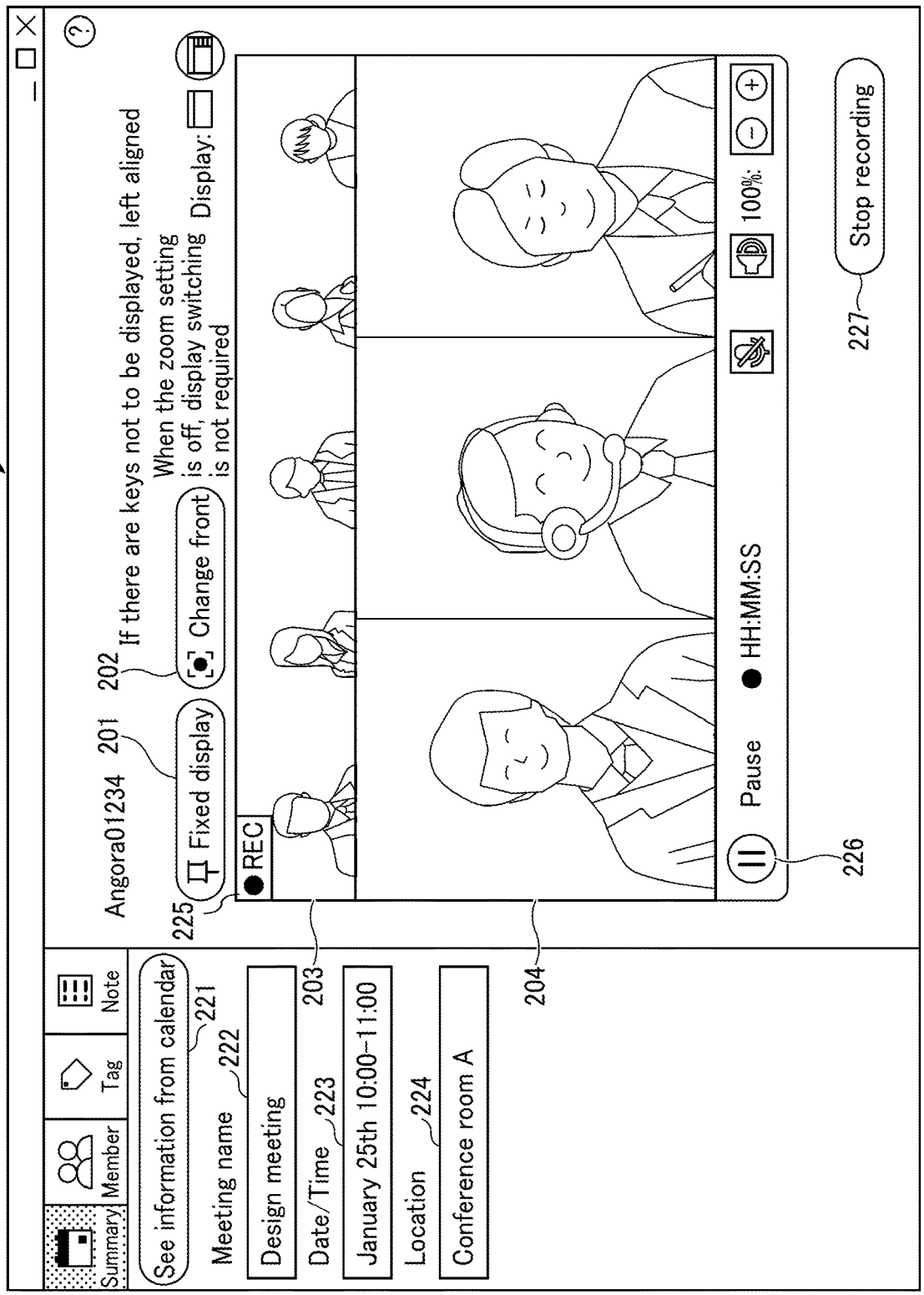
FIG. 17 is a diagram illustrating an example of a recording-in-progress screen displayed by the information recording application during recording, according to an embodiment of the present disclosure.

FIG. 17 illustrates an example of the recording-in-progress screen 220 displayed by the information recording application 41 during recording. In the description referring to FIG. 17, for simplicity, mainly differences from FIG. 14 are described. The recording-in-progress screen 220 is a screen of recording in progress that displays, in real time, the composite moving image being recorded according to the conditions set by the user on the recording setting screen 210. The recording-in-progress screen 220 can be displayed while the teleconference application is being executed. The recording-in-progress screen 220 of FIG. 17 corresponds to the case in which the camera toggle button 211 is on and the PC screen toggle button 212 is off, and displays the panoramic image 203 and the talker image 204 (both of which are moving images) created by the meeting device 60. The recording-in-progress screen 220 displays a recording icon 225, a pause button 226, and a stop recording button 227.

In another example, in the case that the user sets the PC screen toggle button 212 to on, the desktop screen and the screen of the application are displayed next to the panoramic image and the talker image on the recording-in-progress screen 220, as illustrated in FIG. 16.

The pause button 226 is a button for pausing the recording. The pause button 226 also receives an operation of resuming the recording after the recording is paused. The stop recording button 227 is a button for ending the recording. The recording ID does not change when the pause button 226 is pressed, whereas the recording ID changes when the stop recording button 227 is pressed. After pausing or temporarily stopping the recording, the user can set the recording conditions set in the recording setting screen 210 again before resuming the recording or starting recording again. In this case, the information recording application 41 may create multiple recorded files each time the recording is stopped (e.g., when the stop recording button 227 is pressed), or may combine a plurality of files to create one continuous moving image (e.g., when the pause button 226 is pressed). When the information recording application 41 reproduces the composite moving image, the information recording application may reproduce the multiple recorded files continuously as one moving image.

The recording-in-progress screen 220 further includes a see information from calendar button 221, a conference name field 222, a time field 223, and a location field 224. The see information from calendar button 221 is a button that allows the user to acquire conference information from the conference management system 9. In response to pressing of the see information from calendar button 221, the information recording application 41 acquires a list of conferences for which the user has a viewing authority from the information processing system 50 and displays the acquired list of conferences. The user selects a teleconference to be held from the list of conferences. Consequently, the conference information is reflected in the conference name field 222, the time field 223, and the location field 224. The title, the start time and the end time, and the location included in the conference information are reflected in the conference name field 222, the time field 223, and the location field 224, respectively. Further, the conference information in the conference management system and the recording information are associated with each other by the conference ID.

When the teleconference ends and the user finishes recording, a composite moving image with audio is created.

Figure 18:
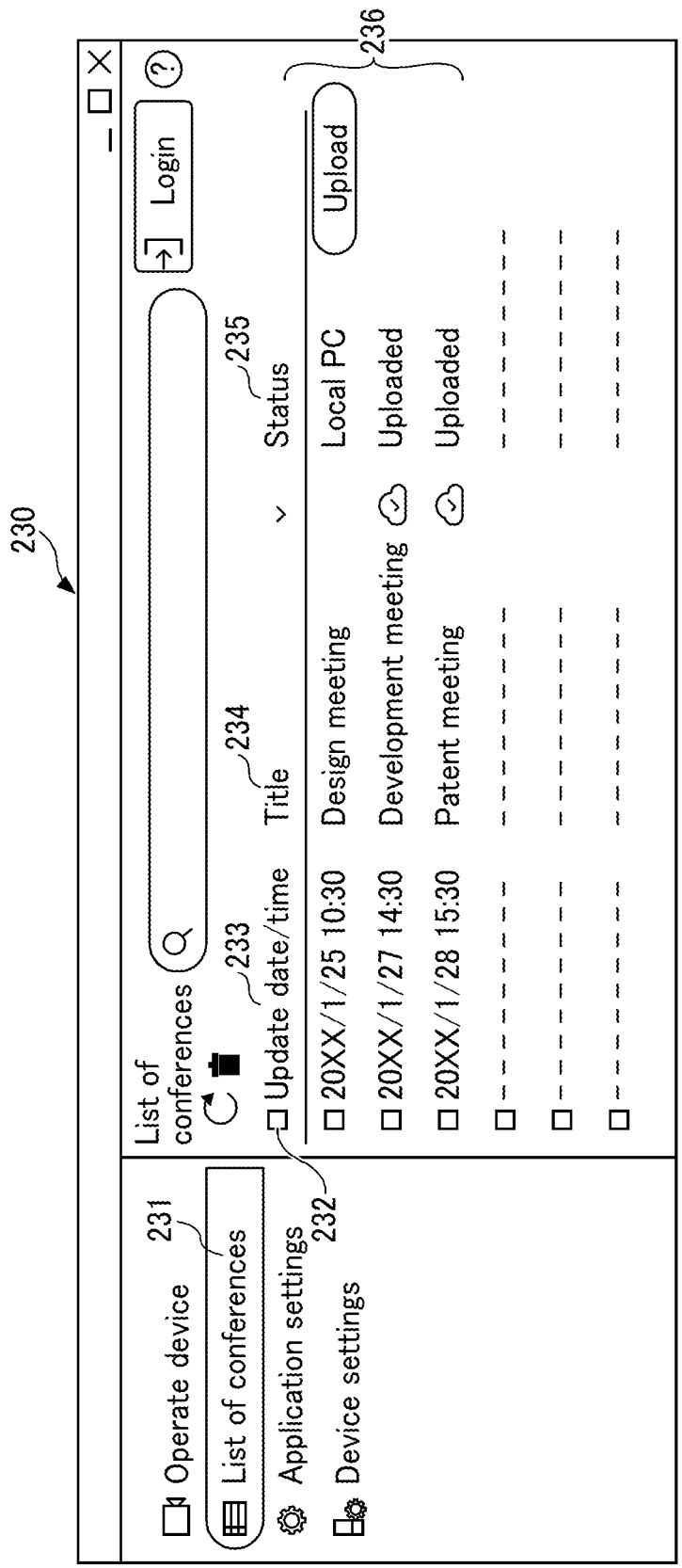
FIG. 18 is a diagram illustrating an example of a conference list screen displayed by the information recording application, according to an embodiment of the present disclosure.

FIG. 18 illustrates an example of a conference list screen 230 displayed by the information recording application 41. The conference list screen 230 displays a list of conferences, specifically, a list of pieces of recording information recorded during teleconferences. The list of conferences includes conferences held in a certain conference room as well as teleconferences. On the conference list screen 230, conference information for which the logged-in user has the viewing authority in the conference information storage unit 5001 and information stored in the recording information storage unit 5002 associated with this teleconference are integrally displayed. In another example, the moving image recording information stored in the information storage unit 1001 is further integrated.

The conference list screen 230 is displayed in response to selecting of a conference list tab 231 by the user on the initial screen 200 of FIG. 11. The conference list screen 230 displays a list 236 of pieces of recording information for which the user has the viewing authority. The conference creator (minutes creator) can set the viewing authority for a participant of the conference. The list of conferences may be a list of stored pieces of recording information, a list of scheduled conferences, a list of pieces of conference data.

The conference list screen 230 includes items of a check box 232, an update date/time 233, a title 234, and a status 235.

The check box 232 receives selection of a recorded file. The check box 232 is used when the user desires to collectively delete the recorded files.

The update date/time 233 indicates a start time and an end time of recording of the composite moving image. In a case that the composite moving image is edited, the update date/time 233 indicates the date and time when the composite moving image is edited.

The title 234 indicates the title (such as an agenda) of the conference. For example, the title is transcribed from the conference information. In another example, the title is set by the user.

The status 235 indicates whether the composite moving image has been uploaded to the information processing system 50. In a case that the composite moving image has not been uploaded, "Local PC" is displayed. In a case that the composite moving image has been uploaded, "Uploaded" is displayed. In a case that the composite moving image has not been uploaded, an upload button is displayed. In a case that there is any composite moving image that has not yet been uploaded, it is desirable that the information recording application 41 automatically upload the composite moving image when the user logs into the information processing system 50.

Figure 19:
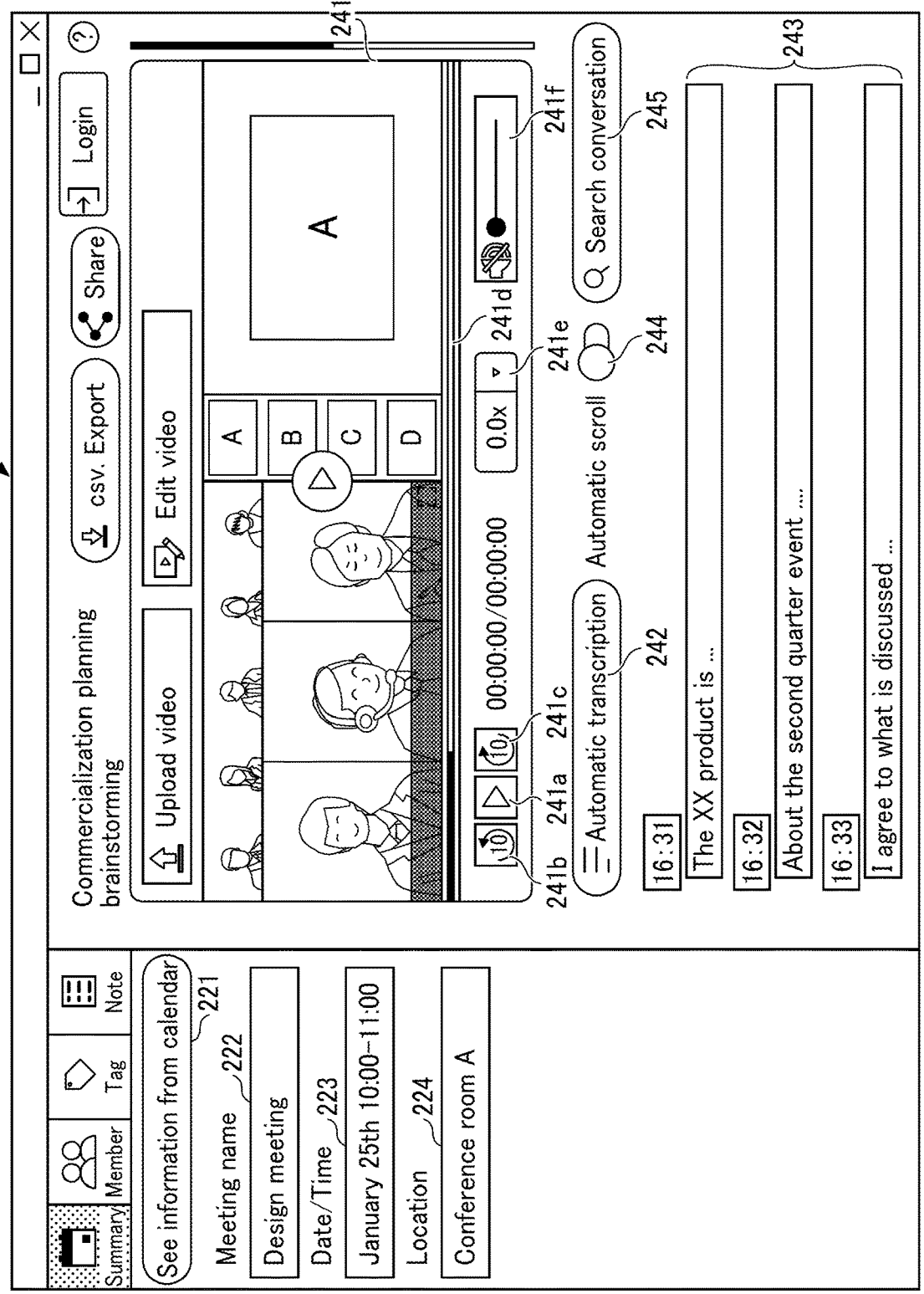
FIG. 19 is a diagram illustrating an example of a recording reproduction screen displayed by the information recording application after a composite moving image is selected, according to an embodiment of the present disclosure.

In response to selecting, for example, a desired title by the user from the list 236 of the composite moving images with a pointing device, the information recording application 41 displays a recording reproduction screen 240 of FIG. 19. The recording reproduction screen 240 allows reproduction of the composite moving image.

FIG. 19 illustrates an example of the recording reproduction screen 240 displayed by the information recording application 41 after the composite moving image is selected. The recording reproduction screen 240 includes a reproduction image display field 241, a transcription button 242, one or more text display fields 243, an automatic scroll button 244, and a search button 245.

The reproduction image display field 241 includes a reproduction button 241a, a rewind button 241b, a fast forward button 241c, a time indicator 241d, a reproduction speed button 241e, and a volume button 241f. The reproduction image display field 241 reproduces and displays the composite moving image. In the composite moving image in reproduction image display field 241 of FIG. 19, the panoramic image and the talker image are arranged on the left side, and the screen of the teleconference application 42 is displayed on the right side. The screen of the teleconference application 42 transitions between an image representing the site and an image of a document during the teleconference. Thus, the user can view a screen of a desired scene by operating various buttons.

When the audio data of the composite moving image being displayed in the reproduction image display field 241 has been converted into text data, spoken content is displayed in text in the text display fields 243.

The transcription button 242 is a button that allows the user to switch whether to display the text data displayed in the text display fields 243 in synchronization with the reproduction time of the composite moving image.

The automatic scroll button 244 is a button that allows the user to switch whether to automatically scroll the text data irrespective of the reproduction time.

The search button 245 is a button that allows the user to designate a keyword and search for text data using the keyword.

In another example, the recording reproduction screen 240 allows downloading of the composite moving image.

Figure 20:
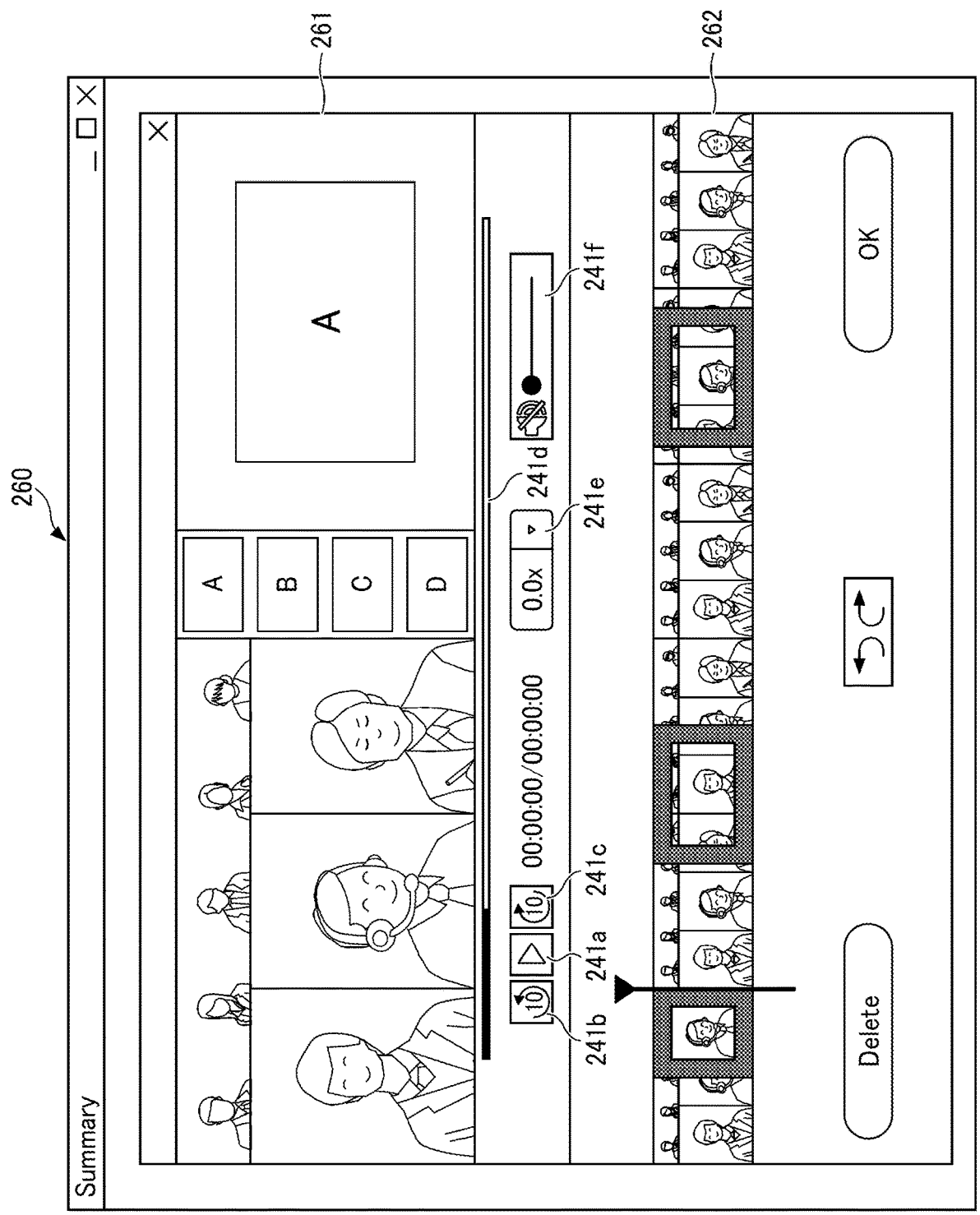
FIG. 20 is a diagram illustrating an example of an edit screen of a composite moving image, according to an embodiment of the present disclosure.

FIG. 20 illustrates an example of an edit screen 260 of the composite moving image. The edit screen 260 transitions from the recording-in-progress screen 220 automatically or in response to a predetermined operation by the user on the recording reproduction screen 240. The edit screen 260 has a first display field 261 and a second display field 262. In the first display field 261, the combined image at a certain moment being reproduced is displayed. In the second display field 262, frames forming the composite moving image are displayed in chronological order. The user can select one or more frames to delete unwanted frames. The user can also take a part of the frames and insert the part of the frames after a desired frame. The edit processing unit 21 edits the composite moving image according to the user's operation, and overwrites the composite moving image with the edited composite moving image or stores the edited composite moving image separately.

Procedure of Operation or Processes

A description is now given of an operation and processes performed by the recording information creation system 100 based on the configuration described above.

Login

Figure 21:
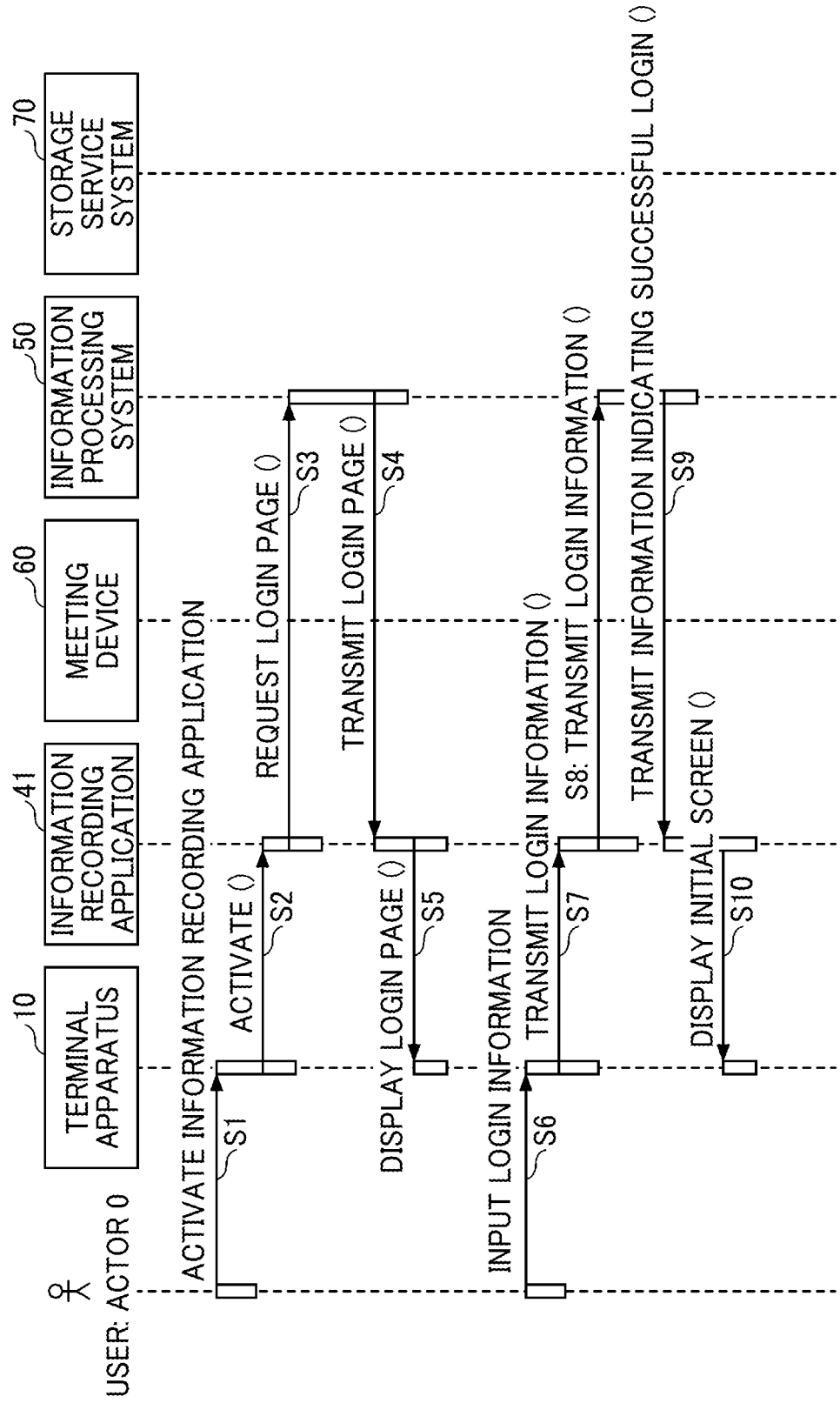
FIG. 21 is a sequence diagram illustrating an example of a procedure or processes according to which a user operates the information recording application operating on the terminal apparatus to log into the information processing system, according to an embodiment of the present disclosure.

FIG. 21 is a sequence diagram illustrating an example of a procedure or processes according to which a user operates the information recording application 41 operating on the terminal apparatus 10 to log into the information processing system 50.

S1: The user inputs an operation to activate the information recording application 41 to the terminal apparatus 10.

S2: In response to the operation, the terminal apparatus 10 activates the information recording application 41.

S3: When the information recording application 41 is activated, the communication unit 11 automatically communicates with the information processing system 50 and requests a login screen.

S4: In response to receiving the request for the login screen, the communication unit 51 of the information processing system 50 transmits screen information of the login screen generated by the screen generation unit 53 to the information recording application 41.

S5: The communication unit 11 of the information recording application 41 receives the screen information of the login screen, and the display control unit 13 displays the login screen.

S6: The user inputs authentication information for logging into a tenant to the information recording application 41. The operation receiving unit 12 of the information recording application 41 receives the input.

S7: The communication unit 11 of the information recording application 41 transmits, to the information processing system 50, a login request with designation of the authentication information.

S8: The communication unit 51 of the information processing system 50 receives the login request, and the authentication unit 52 authenticates the user on the basis of the authentication information. The following description of the present embodiment is given on the assumption that the authentication is successful.

S9: The communication unit 51 of the information processing system 50 transmits information indicating the login success is successful to the information recording application 41.

S10: The communication unit 11 of the information recording application 41 receives the information indicating that the login is successful, and the display control unit 13 displays the initial screen 200.

Storing Composite Moving Image

Figure 22:
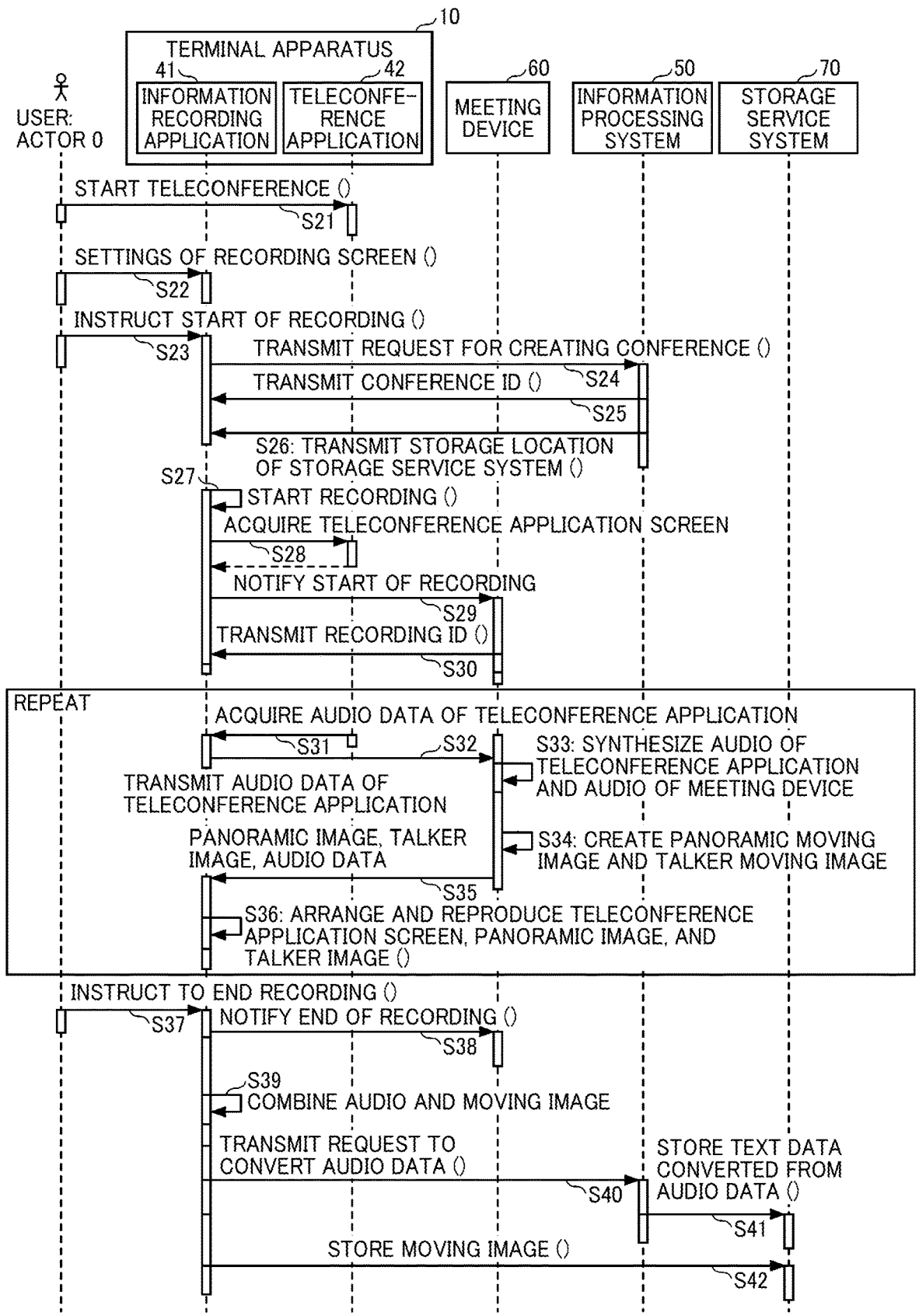
FIG. 22 is a sequence diagram illustrating a procedure in which the information recording application records a panoramic image, a talker image, and a screen of an application, according to an embodiment of the present disclosure.

A description is now given of an operation of storing a composite moving image with reference to FIG. 22. FIG. 22 is a sequence diagram illustrating a procedure in which the information recording application 41 records a panoramic image, a talker image, and a screen of an application.

S21: The user operates the teleconference application 42 to start a teleconference. In the present embodiment, a description is given on the assumption that the teleconference application 42 of the own site 102 and the teleconference application 42 of the other site 101 start the teleconference. The teleconference application 42 of the own site 102 transmits an image captured by the camera of the terminal apparatus 10 and audio collected by the microphone of the terminal apparatus to the teleconference application 42 of the other site 101. The teleconference application 42 of the other site 101 displays the received image on the display and outputs the received audio from the speaker. In substantially the same manner, the teleconference application 42 of the other site 101 transmits an image captured by the camera of the terminal apparatus 10 and audio collected by the microphone of the terminal apparatus to the teleconference application 42 of the own site 102. The teleconference application 42 of the own site 102 displays the received image on the display and outputs the received audio from the speaker. The teleconference applications 42 repeat these processes to implement the teleconference.

S22: The user configures settings relating to recording on the recording setting screen 210 illustrated in FIG. 14 of the information recording application 41. The operation receiving unit 12 of the information recording application 41 receives the settings. In the present embodiment, a description is given on the assumption that the camera toggle button 211 and the PC screen toggle button 212 are both set to on.

In a case that the user reserves a teleconference in advance, a list of teleconferences is displayed in response to pressing of the see information from calendar button 221 of FIG. 19 by the user. The user selects a desired teleconference to be associated with a recorded moving image. Since the user has already logged into the information processing system 50, the information processing system 50 identifies teleconferences for which the user who has logged in has the viewing authority. Since the information processing system 50 transmits the list of the identified teleconferences to the terminal apparatus 10, the user selects a teleconference that is being held or to be held in the future. Thus, information relating to the teleconference such as the conference ID is determined.

Further, even in a case that the user does not reserve a teleconference in advance, the user can create a conference when creating a composite moving image. In the following, a case is described in which the information recording application 41 creates a conference when creating a composite moving image and acquires a conference ID from the information processing system 50.

S23: The user instructs the information recording application 41 to start recording. For example, the user presses the start recording now button 216. The operation receiving unit 12 of the information recording application 41 receives the instruction. The display control unit 13 displays the recording-in-progress screen 220.

S24: Since no teleconference is selected (in other words, no conference ID is determined), the communication unit 11 of the information recording application 41 transmits a teleconference creation request to the information processing system 50.

S25: In response to receiving the teleconference creation request by the communication unit 51 of the information processing system 50, the conference management unit 54 acquires a unique conference ID assigned by the conference management system 9. The communication unit 51 transmits the conference ID to the information recording application 41.

S26: Further, the conference management unit 54 transmits a storage location (an URL of the storage service system 70) in which the composite moving image is to be stored to the information recording application 41 via the communication unit 51.

S27: When the communication unit 11 of the information recording application 41 receives the conference ID and the storage location of the recording file, the image combining unit 17 determines that preparation for recording is completed and starts recording.

S28: The application screen acquisition unit 14 of the information recording application 41 sends a request for a screen of an application selected by the user to the selected application. More specifically, the application screen acquisition unit 14 acquires the screen of the application via the OS. The description given with reference to FIG. 22 is on the assumption that the application selected by the user is the teleconference application 42.

S29: The image combining unit 17 of the information recording application 41 sends a notification indicating the start of recording to the meeting device 60 via the device communication unit 16. With the notification, the image combining unit 17 also sends information indicating that the camera toggle button 211 is on (a request for a panoramic image and a talker image).

S30: In response to receiving the start of recording by the terminal communication unit 61 of the meeting device 60, a unique recording ID is assigned. The terminal communication unit 61 transmits the assigned recording ID to the information recording application 41. In one example, the information recording application 41 assigns the recording ID. In another example, the recording ID is acquired from the information processing system 50.

S31: The audio acquisition unit 15 of the information recording application 41 acquires audio to be output by the terminal apparatus 10 (audio data received by the teleconference application 42).

S32: The device communication unit 16 transmits the audio data acquired by the audio acquisition unit 15 and a synthesis request to the meeting device 60.

S33: In response to receiving the audio data and the synthesis request by the terminal communication unit 61 of the meeting device 60, the audio synthesizing unit 65 synthesizes the received audio data with the audio of the surroundings collected by the audio collecting unit 64. For example, the audio synthesizing unit 65 adds the two audio data items together. Since clear audio around the meeting device 60 is recorded, the accuracy of converting audio especially around the meeting device 60 (in the conference room) increases.

This audio synthesis can also be performed by the terminal apparatus 10. However, by distributing the recording function to the terminal apparatus 10 and the audio processing to the meeting device 60, load on the terminal apparatus 10 and the meeting device 60 is reduced. Alternatively, the recording function may be distributed to the meeting device 60, and the audio processing may be distributed to the terminal apparatus 10.

S34: Further, since the meeting device 60 receives the information indicating that the camera toggle button 211 is on, the panoramic image creation unit 62 creates a panorama image and the talker image creation unit 63 creates a talker image.

S35: The device communication unit 16 of the information recording application 41 repeatedly acquires the panoramic image and the talker image from the meeting device 60. Further, the device communication unit 16 repeatedly requests the meeting device 60 for the synthesized audio data to acquire the synthesized audio data. The device communication unit 16 may send a request to the meeting device 60 to perform these acquisitions. Alternatively, the meeting device 60 that has received information the indicating that the camera toggle button 211 is on may automatically transmit the panoramic image and the talker image. The meeting device 60 that has received the audio data synthesis request may automatically transmit the synthesized audio data to the information recording application 41.

S36: The image combining unit 17 of the information recording application 41 creates a combined image by arranging the screen of the application acquired from the teleconference application 42, the panoramic image, and the talker image. The image combining unit 17 repeatedly creates combined images and designates the combined images to a frame forming a moving image, to create a composite moving image. Further, the image combining unit 17 stores the audio data received from the meeting device 60.

The information recording application 41 repeats the above steps S31 to S36.

S37: When the teleconference ends and the recording is no longer to be performed, the user instructs the information recording application 41 to end the recording. For example, the user presses the stop recording button 227. The operation receiving unit 12 of the information recording application 41 receives the instruction.

S38: The device communication unit 16 of the information recording application 41 notifies the meeting device 60 of the end of recording. As a result, the meeting device 60 completes the creation of the panoramic image and the talker image and the synthesis of the audio.

S39: The image combining unit 17 of the information recording application 41 combines the composite moving image with the audio data, to create the composite moving image with audio.

S40: Further, in a case that the user puts a mark in the check box 215 associated with "Automatically transcribe after uploading the record" on the recording setting screen 210, the audio data processing unit 18 requests the information processing system 50 to convert the audio data into text data.

Specifically, the audio data processing unit 18 designates the URL of the storage location and transmits a request for converting the audio data combined with the composite moving image to the information processing system 50 together with the conference ID and the recording ID via the communication unit 11.

S41: The communication unit 51 of the information processing system 50 receives the request for converting the audio data, and the text conversion unit 55 converts the audio data into text data using the speech recognition service system 80. The communication unit 51 stores the text data in the same storage location (the URL of the storage service system 70) as the storage location of the composite moving image. The text data is associated with the composite moving image by the conference ID and the recording ID in the recording information storage unit 5002. In another example, the text data may be managed by the conference management unit 54 of the information processing system 50 and stored in the storage unit 5000. In another example, the terminal apparatus 10 may request the speech recognition service system 80 to perform speech recognition, and may store text data acquired from the speech recognition service system 80 in the storage location. The description given above is of an example in which the speech recognition service system 80 returns the converted text data to the information processing system 50. In another example, the speech recognition service system 80 directly transmits the text data to the URL of the storage location. The speech recognition service system 80 may be selected or switched among multiple services according to setting information set in the information processing system 50 by the user.

S42: The upload unit 20 of the information recording application 41 stores the composite moving image in the storage location of the composite moving image via the communication unit 11. In the recording information storage unit 5002, the composite moving image is associated with a conference ID and a recording ID.

Uploaded is recorded in the composite moving image.

Since the storage location is notified to the user, the user can share the composite moving image with other participant by notifying the storage location by e-mail or the like. Although different devices or apparatuses respectively create the composite moving image, the audio data, and the text data, they are collected and stored in one storage location. With this configuration, the user or the like can view the collected image or data later in a simple manner.

In the case that speech recognition is performed in real time, the meeting device 60 or the terminal apparatus 10 transmits audio data to the information processing system 50 in real time. The terminal apparatus 10 displays text data transmitted from the meeting device 60 or sent back from the information processing system 50 on the recording-in-progress screen 220 and stores the text data.

The processes of steps S31 to S36 does not have to be performed in an order described with reference to FIG. 22. For example, the order of the audio data synthesis and the generation of the combined image may be switched.

Change Settings During Creation of Composite Moving Image

Figure 23:
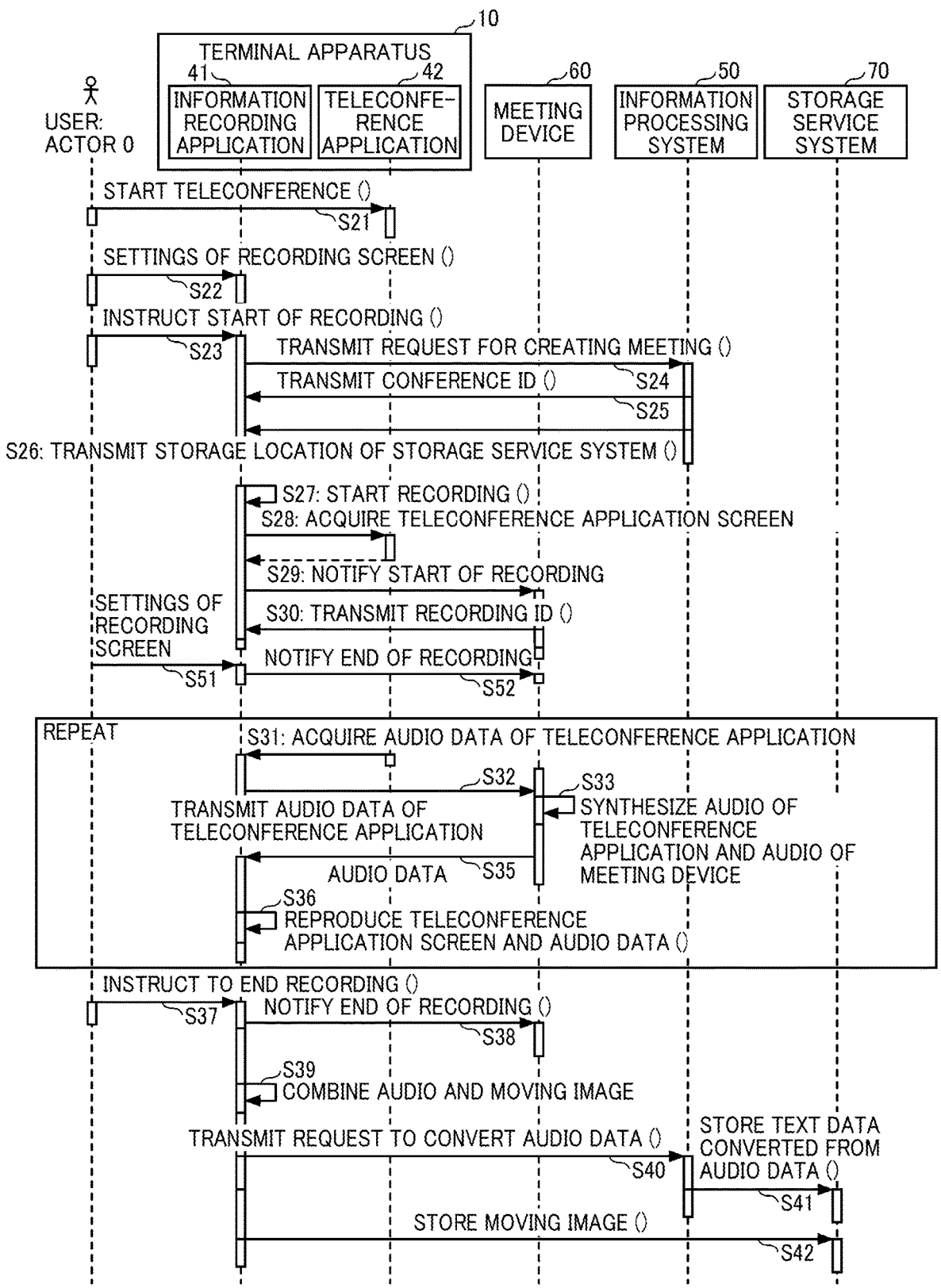
FIG. 23 is a sequence diagram illustrating an example of a procedure in which settings for the recording setting screen is changed during creation of a composite moving image, and the information recording application records a panoramic image, a talker image, and a screen of an application with the changed settings, according to an embodiment of the present disclosure.

A description is now given of a case in which the user changes the settings on the recording setting screen 210 while the information recording application 41 is creating the composite moving image, with reference to FIG. 23. FIG. 23 is a sequence diagram illustrating an example of a procedure in which the settings for the recording setting screen 210 is changed during the creation of the composite moving image, and the information recording application 41 records the panoramic image, the talker image, and the screen of the application with the changed settings. In the description referring to FIG. 23, for simplicity, mainly differences from FIG. 22 are described.

In FIG. 23, during the repetition of the processes of steps S31 to S36, the user changes the settings on the recording setting screen 210 in step S51. In a case that the camera toggle button 211 and the PC screen toggle button 212 are both set to on before the change of settings, the settings can be changed as the following options A to C, for example. The image combining unit 17 generates the composite moving image according to the changed settings.

A. The camera toggle button 211 and the PC screen toggle button 212 are both set to off.
B. The camera toggle button 211 is set to off, and the PC screen toggle button 212 is kept on.
C. Although the PC screen toggle button 212 is kept on, an application whose screen is to be saved is changed.

Referring to FIG. 23, a description is given of an example in which the settings are changed as the option B.

S52: Since the camera toggle button 211 is set to off, the image combining unit 17 of the information recording application 41 notifies the meeting device 60 of the end of recording via the device communication unit 16. Accordingly, in the procedure of FIG. 23, the process of creating the panoramic image and the talker image in step S34 is omitted. In step S35, only the audio data is transmitted from the meeting device 60 to the information recording application 41.

In step S36, the image combining unit 17 creates a combined image from only the screen of the application acquired from the teleconference application 42. In this case, the panoramic image and the talker image that are present when the camera toggle button 211 is on are not present. Accordingly, for example, the image combining unit 17 arranges only the screen of the application in a large size. In another example, the image combining unit 17 arranges the screen in the same or in substantially the same manner as in the case that the panoramic image and the talker image are present. In one example, the image combining unit 17 stores the composite moving image as one recording file. In another example, the image combining unit 17 acquires a recording ID for one change of the settings from the meeting device 60 and stores the composite moving image as another recording file.

In a case that the settings are changed as the option A, the process of the step S28 is further omitted, and the screen of the application is also not displayed in the step S36.

In a case that the settings are changed as the option B, the screen of the application acquired by the information recording application 41 is changed in step S28.

As described, when the recording settings are changed during the creation of the composite moving image, the information recording application 41 can create the composite moving image according to content of the change. By switching an application to be recorded during recording according to an operation by the user, a screen of an application displayed during the teleconference is included in the composite moving image.

Store Screens of all Applications being Executed

Figure 24:
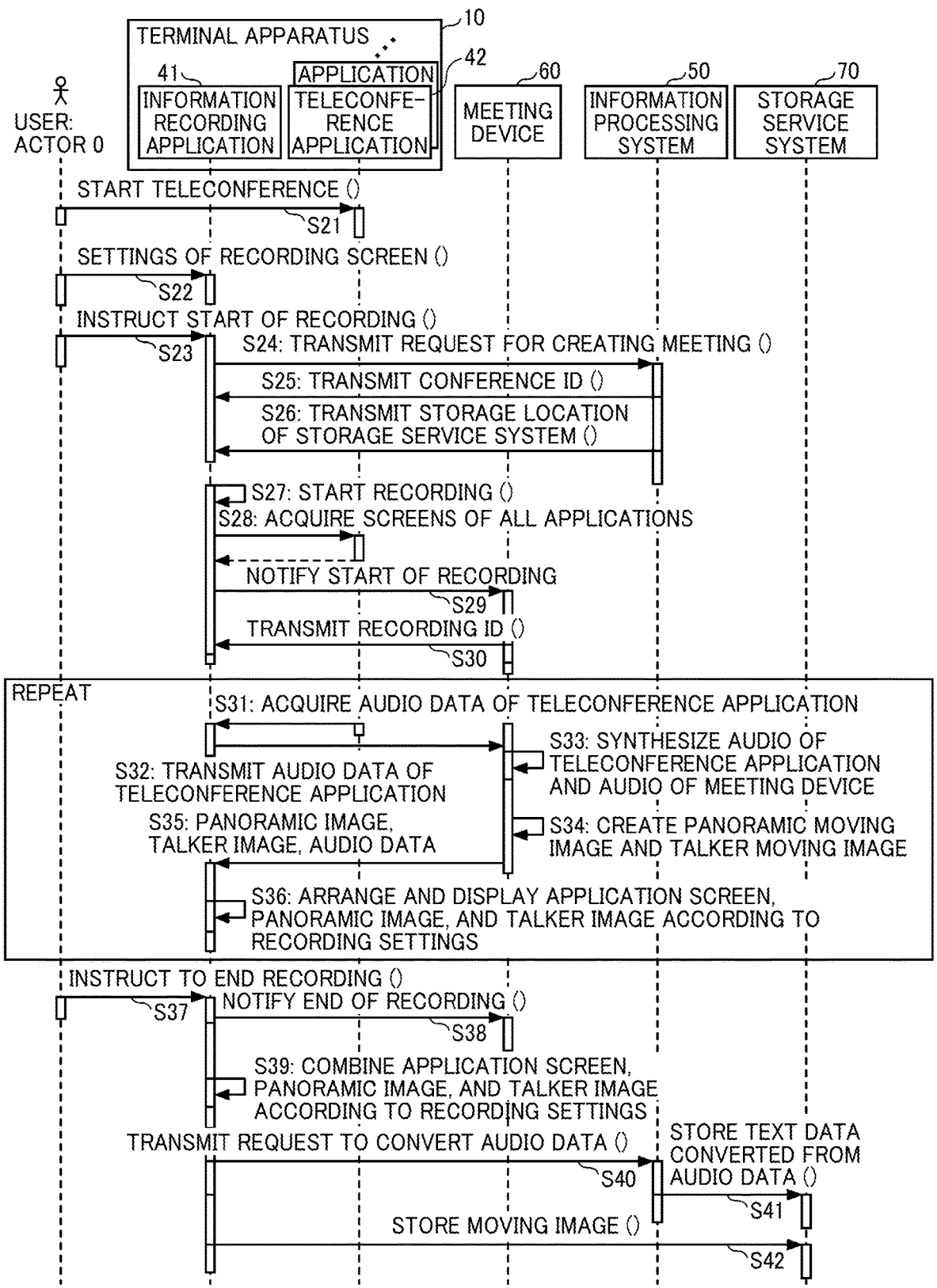
FIG. 24 is a sequence diagram illustrating an example of a procedure of storing screens of all applications being executed and changing an image (moving image) to be included in recording information after a teleconference ends, according to an embodiment of the present disclosure.

A description is now given of an example in which screens of all applications being executed are stored and the information recording application 41 creates a composite moving image after the end of the teleconference, with reference to FIG. 24. FIG. 24 is a sequence diagram illustrating an example of a procedure of storing screens of all applications being executed and changing an image (moving image) to be included in the recording information after the teleconference ends. In the description referring to FIG. 24, for simplicity, mainly differences from FIG. 22 are described.

In FIG. 24, in step S28, the application screen acquisition unit 14 of the information recording application 41 acquires screens of all applications being executed via the OS, for example. The terminal apparatus 10 stores the screen of each of the applications as a moving image in association with identification information of the each of the application.

In step S36, the image combining unit 17 combines the screen of the application with the panoramic image and the talker image according to the recording settings, and the display control unit 13 displays the combined image.

When the recording ends in step S37, the image combining unit 17 combines the screens of all the applications selected on the recording setting screen 210 with the panoramic image and the talker image in step S39.

In a case that the camera toggle button 211 is off, the panoramic image and the talker image are not combined with the screens of the all the applications.

As described, by storing the screens of all the applications being executed, even when the user changes settings on the recording setting screen 210 during recording, the screens of the applications can be included in the composite moving image from the start of the teleconference. The user can perform the recording setting after the end of the teleconference. Accordingly, by recording the screens of all the applications, the user can determine a screen of a desired application to be included in the recording information later.

Figure 25:
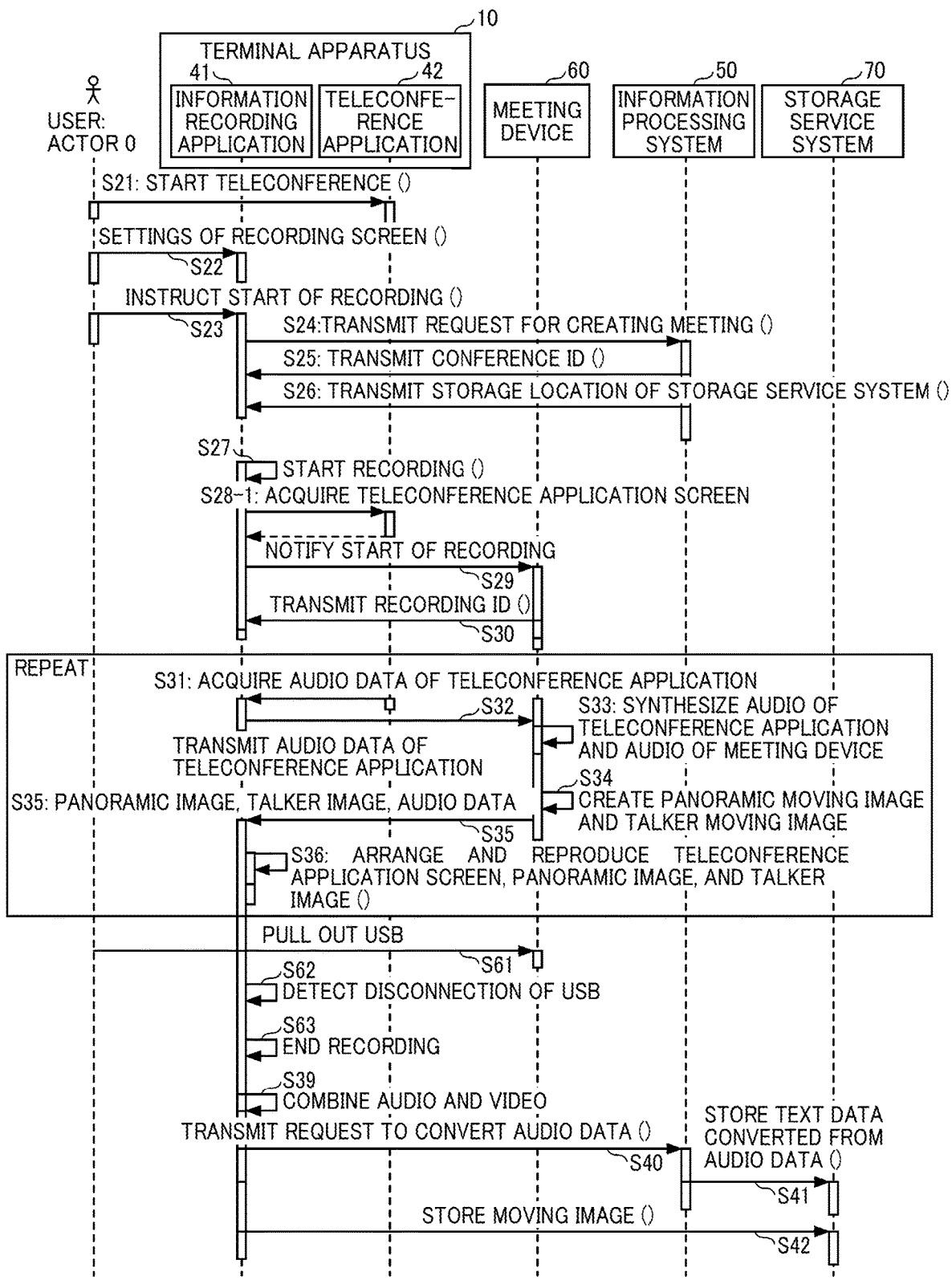
FIG. 25 is a sequence diagram illustrating an example of a procedure of appropriately ending recording when communication between the terminal apparatus and the meeting device is disconnected during recording, according to an embodiment of the present disclosure.

Communication Disconnection Between Terminal Apparatus and Meeting Device During Recording A description is now given of an example in which communication between the terminal apparatus 10 and the meeting device 60 is disconnected during recording, with reference to FIG. 25. FIG. 25 is a sequence diagram illustrating an example of a procedure of appropriately ending recording when communication between the terminal apparatus 10 and the meeting device 60 is disconnected during the recording. In the description referring to FIG. 25, for simplicity, mainly differences from FIG. 22 are described.

S61: The user accidentally pulls out a USB cable connecting the terminal apparatus 10 and the meeting device 60. Other examples of communication disconnection include abnormality of a wireless LAN router and the turning off of the meeting device 60.

S62: The device communication unit 16 of the information recording application 41 detects that the USB cable has been pulled out, for example, when the external device connection I/F detect no voltage. In another example, the device communication unit 16 detects communication interruption, for example, on the basis of no response from the meeting device 60.

S63: When communication with the meeting device 60 is unavailable, the information recording application 41 cannot acquire the synthesized audio data even when the camera toggle button 211 is off. Accordingly, the information recording application 41 ends the recording. The subsequent processes are performed in the same or substantially the same manner as step S37 and subsequent steps of FIG. 22.

Case in which Applications Exist in Cloud and Meeting Device and Cloud Application are Connected A description is now given of a system configuration in a case that applications exist on a cloud and the meeting device 60 and the applications on the cloud communicate with each other, with reference to FIG. 26A to FIG. 26D. FIG. 26A to FIG. 26D each illustrates an example of a configuration of the recording information creation system 100. The configuration and communication connection relationship for the information recording application 41 to acquire an image around the meeting device 60 and a screen displayed by the teleconference application 42 may be as the following variations.

Figure 26A:
FIG. 26A, FIG. 26B, FIG. 26C, and FIG. 26D are diagrams each illustrating an example of a configuration of the recording information creation system, according to an embodiment of the present disclosure.
Figure 26B:
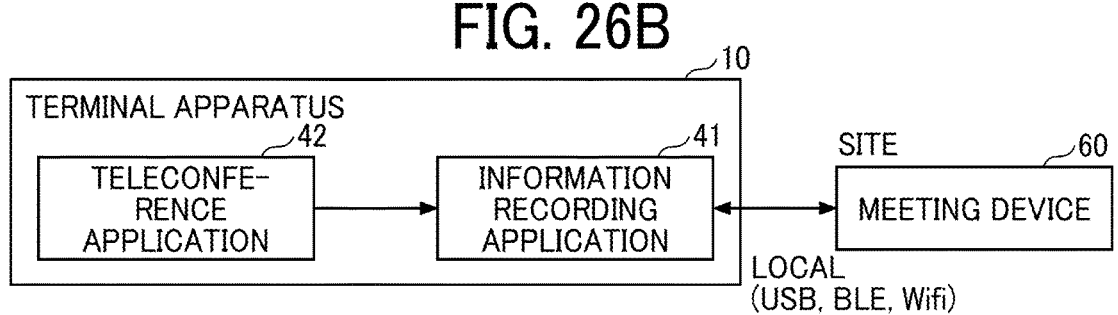

FIG. 26A illustrates an example of a configuration in which the teleconference application 42 and the information recording application 41 operate on different terminal apparatuses. In this case, the image information of the surroundings captured by the meeting device 60 is transmitted from the meeting device 60 located in the site to the information recording application 41.

The information recording application 41 also acquires the screen information displayed by the teleconference application 42 and creates recording information by using the image information of the surroundings captured by the meeting device 60 and the screen information displayed by the teleconference application 42.

The FIG. 26A illustrates a configuration that is same as the configuration illustrated in FIG. 2. The information recording application 41 executed on the terminal apparatus 10 acquires screen information displayed by the teleconference application 42 executed on the terminal apparatus 10, audio of a teleconference, image information of surroundings captured by the meeting device 60, and audio at the site, to create recording information. The terminal apparatus 10 and the meeting device 60 are directly connected to each other locally (e.g., by USB, BLE®, Wi-Fi).

Figure 26C:
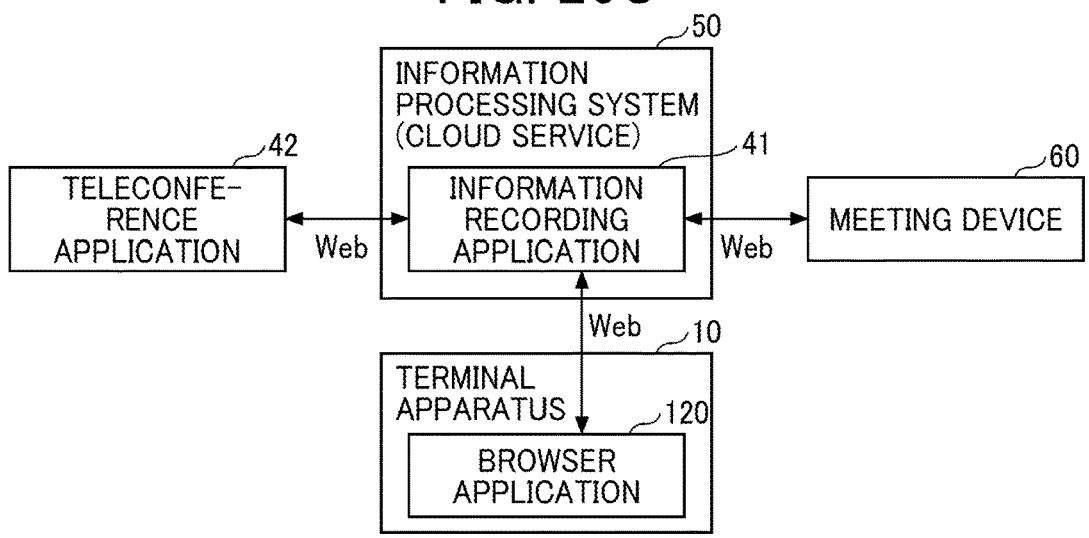

FIG. 26C illustrates an example of a configuration in which the information recording application 41 operates on the information processing system 50. The information processing system 50 (on the cloud) executes the information recording application 41 and acquires image information of the surroundings from the meeting device 60 at the site and screen information of the teleconference application 42 from the terminal apparatus 10. Accordingly, the recording information is created by the information recording application 41 on the information processing system 50 and a web application executed on the terminal apparatus 10.

The information recording application 41 of the information processing system 50 performs main processing for creating recording information, and a web browser application 120 of the terminal apparatus 10 performs processing relating to UI display, input, and the like. The information recording application 41 on the information processing system 50 is connected to the meeting device 60 and the terminal apparatus 10 through the web (the Internet).

The information recording application 41 on the information processing system 50 acquires screen information displayed by the teleconference application 42 executed by the terminal apparatus 10 and audio of the teleconference through the web (the Internet). Further, the information recording application 41 on the information processing system 50 acquires image information of the surroundings captured by the meeting device 60 and audio at the site through the web, to create recording information.

Other processes are performed as described in the present embodiment.

Figure 26D:
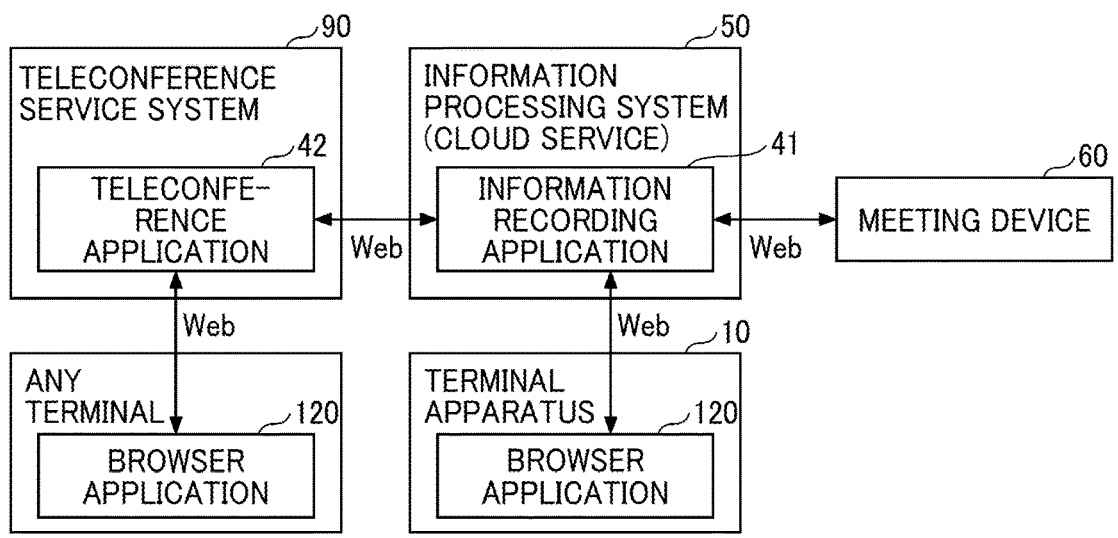

FIG. 26D illustrates an example of a configuration in which the teleconference service system 90 and the information processing system 50 communicate with each other. The information processing system 50 includes the information recording application 41 and acquires image information of the surroundings from the meeting device 60 at the site and the screen information of the teleconference application 42 from another cloud service (the teleconference service system). The information recording application 41 on the information processing system 50, the meeting device 60, and the cloud service that includes an application (the teleconference application 42) are connected through the web (the Internet). The information recording application 41 on the information processing system 50 acquires the screen information displayed by the teleconference application 42 and the audio from the cloud service that includes the teleconference application 42. Other configurations are the same as those illustrated in FIG. 26C.

As described above, by the recording information creation system 100 according to the present embodiment, in the composite moving image, the panoramic image of the surroundings including the user and the talker image are displayed. Further, in the composite moving image, a screen of an application displayed during the teleconference, such as the teleconference application 42, is displayed. When a participant of the teleconference or a person who has not participated in the teleconference views the composite moving image as the minutes, scenes during the teleconference are reproduced with a sense of presence. Further, the information recording application 41 records both the screen information displayed by the application (e.g., the teleconference application) selected by the information recording application 41 and the image information of the surroundings around the device in the site (e.g., in the conference room). Accordingly, even when the screen displayed by the teleconference application 42 is switched, recording information in which content of the teleconference (remote communication) and scenes of the site (e.g., scenes in a conference room) are recorded thoroughly.

Variations

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, the terminal apparatus 10 and the meeting device 60 may be configured as a single entity. The meeting device 60 may be externally attached to the terminal apparatus 10. The meeting device 60 may be implemented by a celestial-sphere camera, a microphone, and a speaker connected to one another by cables.

The meeting device 60 may be provided also at the other site 101. The meeting device 60 at the other site 101 separately creates a composite moving image and text data. Multiple meeting devices 60 may be provided at a single site. In this case, the multiple meeting devices 60 respectively create multiple pieces of recording information.

The arrangement of the panoramic image 203, the talker image 204, and the screen of the application in the composite moving image used in the present embodiment is merely an example. The panoramic image 203 may be displayed below the talker image 204. The user may change the arrangement. The user may switch between non-display and display individually for the panoramic image 203 and the talker image 204 during reproduction.

For example, the functional configuration illustrated in FIG. 7 is divided according to main functions in order to facilitate understanding of processing performed by the terminal apparatus 10, the meeting device 60, and the information processing system 50. The scope of the present invention is not limited by how the process units are divided or by the names of the process units. The processes performed by the terminal apparatus 10, the meeting device 60, and the information processing system 50 may be divided into more process units in accordance with the content of the processes. Further, one process may be divided to include the larger number of processes.

The apparatuses or devices described in the above-described embodiments are merely one example of multiple computing environments that implement the embodiments disclosed herein. In some embodiments, the information processing system 50 includes multiple computing devices, such as a server cluster. The multiple computing devices are configured to communicate with one another through any type of communication link, including a network, a shared memory, etc., and perform the processes disclosed herein.

Further, the information processing system 50 can be configured to share the disclosed processing steps, for example, the processes illustrated in FIG. 22, in various combinations. For example, a process performed by a given unit may be performed by a plurality of information processing apparatuses included in the information processing system 50. Further, the elements of the information processing system 50 are combined into one server apparatus or are divided into a plurality of apparatuses.

Each of the functions of the above-described embodiments can be implemented by one or more processing circuits or circuitry. The "processing circuits or circuitry" in the present disclosure includes a programmed processor to execute each function by software, such as a processor implemented by an electronic circuit, and devices, such as an Application Specific Integrated Circuit (ASIC), a Digital Signal Processors (DSP), a Field Programmable Gate Array (FPGA), and conventional circuit modules arranged to perform the recited functions.

In the related art, recording information of remote communication is not created on the basis of screen information acquired from an application being executed and images of surroundings. For example, storing only information obtained by imaging the inside of a conference room makes it difficult to reproduce a situation of remote communication performed while capturing the inside of the conference room.

According to one or more embodiments of the present disclosure, a recording information creation system is provided that creates recording information of remote communication on the basis of screen information acquired from an application being executed and image information of surroundings around a device and reproduces a situation of remote communication performed while imaging the inside of a conference room.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A meeting device, adapted to be in communication with a terminal apparatus, comprising:
a camera;
a microphone; and
a processor, the processor being configured to:
create a panoramic image from a predetermined angle of view of a spherical image acquired by the camera capturing surroundings, wherein the panoramic image is created from a portion of the spherical image based on the predetermined angle of view;
create a talker image from the panoramic image, the created talker image including a talker identified based on a direction from which the microphone acquired audio; and
transmit the panoramic image and the talker image to the terminal apparatus.

2. The meeting device according to claim 1, wherein the processor is further configured to:
identify a plurality of talkers based on a plurality of recent utterances; and
create a plurality of talker images, with each identified talker included in a respective talker image.

3. The meeting device according to claim 1, wherein the processor is further configured to:
recognize all participants from the panoramic image; and
create a plurality of talker images, with each recognized participants included in a respective talker image.

4. The meeting device according to claim 1, wherein the processor is further configured to create one talker image from a designated area of the panoramic image.

5. The meeting device according to claim 1, wherein the panoramic image is an image including a 360-degree horizontal view around the meeting device.

6. The meeting device according to claim 5, wherein an angle of a front side of the panoramic image is adjustable.

7. A terminal apparatus, adapted to be in communication with a meeting device, comprising:
a display; and
a processor, wherein the processor is configured to:
receive, from a meeting device including a camera and microphone,
(i) a panoramic image created from a predetermined angle of view of a spherical image acquired by the camera capturing surroundings, wherein the panoramic image is created from a portion of the spherical image based on the predetermined angle of view, and
(ii) a talker image created from the panoramic image, the created talker image including a talker identified based on a direction from which the microphone acquired audio; and
cause the display to display the panoramic image and talker image.

8. The terminal apparatus according to claim 7, wherein the processor is further configured to:
receive selection of an application running on the terminal apparatus; and
cause the display to display the panoramic image, the talker image, and a display screen created by the selected application.

9. The terminal apparatus according to claim 7, wherein the processor is further configured to:
receive selection of a plurality of applications running on the terminal apparatus; and
cause the display to display the panoramic image, talker image, and a plurality of display screens created by the plurality of selected applications.

10. The terminal apparatus according to claim 8, wherein the processor is further configured to:
receive a recording start instruction; and
begin recording the panoramic image, talker image, and the display screen created by the selected application that are currently displayed on the display in response to receiving the recording start instruction.

11. The terminal apparatus according to claim 9, wherein the processor is further configured to:
receive a recording start instruction; and
begin recording the panoramic image, talker image, and the plurality of display screens created by the plurality of selected applications that are currently displayed on the display in response to receiving the recording start instruction.

12. A remote conference system comprising:
a terminal apparatus including a display; and
a meeting device including a camera and a microphone, the meeting device being configured to:
create a panoramic image from a predetermined angle of view of a spherical image acquired by the camera capturing surroundings, wherein the panoramic image is created from a portion of the spherical image based on the predetermined angle of view; and
create a talker image from the panoramic image, the created talker image including a talker identified based on a direction from which the microphone acquired audio; and the terminal apparatus being configured to cause the display to display the panoramic image and talker image that are created by the meeting device.

13. The meeting device according to claim 1, wherein the processor is further configured to: create the panoramic image including 180° or more in a horizontal direction from the predetermined angle of view of the portion of the spherical image acquired by the camera capturing the surroundings before creating the talker image including the talker identified based on the direction from which the microphone acquired audio from the panoramic image.

14. The meeting device according to claim 1, wherein the processor is further configured to: create the panoramic image including 360° in a horizontal direction from the predetermined angle of view of the portion of the spherical image acquired by the camera capturing the surroundings before creating the talker image including the talker identified based on the direction from which the microphone acquired audio from the panoramic image.

15. The meeting device according to claim 1, wherein the processor is further configured to create the panoramic image by performing perspective projection transformation at predetermined angles of view above and below a horizontal direction, which uses a horizontal direction of the meeting device as a reference.

16. The meeting device according to claim 1, wherein the talker image is created from an area specified by moving a rectangular window, which is displayed on the panoramic image, across the panoramic image.

17. The meeting device according to claim 1, wherein an angle of a front side of the panoramic image is adjustable through receiving an operation from a user to slide the panoramic image displayed on the screen left or right.

18. The meeting device according to claim 1, wherein when displayed on a display of the terminal apparatus, the panoramic image is configured such that a position displayed as a front can be changed.

19. The meeting device according to claim 1, wherein the panoramic image is created from a portion in a vertical direction of the spherical image based on the predetermined angle of view.

20. The meeting device according to claim 1, wherein the panoramic image is created by cutting out a predetermined angle of view in a vertical direction of the spherical image with reference to a horizontal direction of the meeting device.

21. The meeting device according to claim 1, wherein the predetermined angle of view of the panoramic image in a vertical direction has an upper angle greater than a lower angle.

* * * * *